US006483524B1

(12) United States Patent
Petchenkine et al.

(10) Patent No.: US 6,483,524 B1
(45) Date of Patent: Nov. 19, 2002

(54) PREPRESS WORKFLOW METHOD USING RASTER IMAGE PROCESSOR

(75) Inventors: Andri P. Petchenkine; Eugene A. Liamkin, both of West Melbourne, FL (US)

(73) Assignee: Global Graphics Software Limited, Barrington, Cambridge (*) Notice: Subject to any disclaimer, the term of this patent is extended or adjusted under 35 U.S.C. 154(b) by 0 days.

(21) Appl. No.: 09/411,327

(22) Filed: Oct. 1, 1999

(51) Int. Cl.$^7$ ............................. G06F 3/00; G06F 9/44
(52) U.S. Cl. ........................ 345/763; 345/835
(58) Field of Search ................. 345/326, 339, 345/340, 347, 348, 349, 352, 967, 969, 970, 700, 734–736, 763, 764, 769, 771, 780, 781, 808–810, 835, 839, 841, 843, 856; 700/83

(56) References Cited

U.S. PATENT DOCUMENTS

| | | | |
|---|---|---|---|
| 5,029,115 A | 7/1991 | Geraci ........................ 345/601 |
| 5,075,874 A | 12/1991 | Steeves et al. ............. 358/1.13 |
| 5,303,334 A | 4/1994 | Snyder et al. ............... 358/1.9 |
| 5,309,246 A | 5/1994 | Barry et al. ................ 358/298 |
| 5,386,568 A | 1/1995 | Wold et al. .................. 717/10 |
| 5,388,192 A | 2/1995 | Ohsawa et al. ............ 345/634 |
| 5,428,747 A | 6/1995 | Kitamoto ..................... 710/1 |
| 5,437,008 A | 7/1995 | Gay et al. .................. 707/502 |
| 5,455,952 A | 10/1995 | Gjovaag ..................... 717/1 |
| 5,463,730 A | 10/1995 | Hatada ..................... 345/810 |
| 5,546,528 A | 8/1996 | Johnston .................... 345/807 |
| 5,577,189 A | 11/1996 | Gay et al. ................. 345/800 |
| 5,584,036 A | 12/1996 | Kashihara ................. 709/102 |
| 5,619,624 A | 4/1997 | Schoenzeit et al. ........ 345/418 |
| 5,636,122 A | 6/1997 | Shah et al. ................ 701/207 |
| 5,666,543 A | 9/1997 | Gartland .................... 707/526 |
| 5,680,530 A * | 10/1997 | Selfridge et al. .......... 345/440 |
| 5,699,099 A | 12/1997 | Garand et al. ............. 347/172 |
| 5,708,764 A | 1/1998 | Borrel et al. .............. 395/419 |
| 5,734,837 A | 3/1998 | Flores et al. ................. 705/7 |
| 5,745,122 A | 4/1998 | Gay et al. .................. 345/619 |
| 5,745,666 A | 4/1998 | Gilley et al. ............... 345/428 |
| 5,760,775 A * | 6/1998 | Sklut et al. ................ 345/349 |
| 5,790,119 A | 8/1998 | Sklut et al. ................ 345/839 |
| 5,812,140 A | 9/1998 | Borg et al. ................ 345/428 |
| 5,815,243 A | 9/1998 | Bailey et al. ................ 355/27 |
| 5,826,237 A | 10/1998 | Macrae et al. ............... 705/2 |
| 5,831,632 A | 11/1998 | Schuster et al. .......... 345/441 |
| 5,850,221 A * | 12/1998 | Macrae et al. ............ 345/853 |
| 5,870,091 A | 2/1999 | Lazarony, Jr. et al. ..... 345/804 |

(List continued on next page.)

FOREIGN PATENT DOCUMENTS

WO        WO92/09948        6/1992

OTHER PUBLICATIONS

Hunt, N.; "IDF: A Graphical Data Flow Programming Language for Image Processing and Computer Vision"; Proceedings of the International Conference on Systems, Man and Cybernetics, US, New York, IEEE, vol. –, Nov. 4, 1990; pp. 351–360.

*Primary Examiner*—Crescelle N. dela Torre
(74) *Attorney, Agent, or Firm*—Darby & Darby

(57) ABSTRACT

A method of configuring a prepress workflow that includes a raster image processor (RIP) is disclosed, together with a graphical user interface. A prepress memory manager is loaded on a local computer as a result of user input such that a graphical user interface is displayed on a computer screen and includes a prepress system design palette and a raster image processor (RIP) module icon that represents a raster image processor distributed object module that is used in a prepress workflow operation. The RIP distributed object module can be configured by user interfacing with the graphical user interface.

25 Claims, 32 Drawing Sheets

U.S. PATENT DOCUMENTS

| | | | |
|---|---|---|---|
| 5,872,569 A | 2/1999 | Salgado et al. | 345/764 |
| 5,898,820 A | 4/1999 | Borg et al. | 358/1.9 |
| 5,913,018 A | 6/1999 | Sela | 358/1.17 |
| 6,037,940 A | 3/2000 | Schroeder et al. | 345/763 |
| 6,115,640 A | 9/2000 | Tarumi | 700/99 |
| 6,157,735 A | 12/2000 | Holub | 382/167 |
| 6,225,998 B1 * | 5/2001 | Okita et al. | 345/853 |
| 6,275,977 B1 * | 8/2001 | Nagai et al. | 717/1 |

* cited by examiner

FIG. 28.

File OutPut setup

Module name: Que Central

Move type
- ○ Load balance
- ⊙ Polling

Max Sizes of Files in Directory: [    ] K.

| Name | Path | Error Path | LogFile | Hold |
|---|---|---|---|---|
| RIP Input #1 | D:\1 | D:\1\Error | D:\1\LogFile | . |
| RIP Input #2 | D:\2 | D:\2\Error | D:\2\LogFile | Hold |
| RIP Input #3 | D:\3 | D:\3\Error | D:\3\LogFile | . |

[Add] [Edit] [Delete]

[Load from file] [Save to file]  [Ok] [Cancel]

| Job ID | Doc ID | Passed Job | Page | Color | Date | Time | Type | Size | Destination | dev | # |
|---|---|---|---|---|---|---|---|---|---|---|---|
| 68 | 3 | NEWS.PDF | 1 | GrayComposite | 3/27/99 | 10:02 | RST | 1056... | 38366948 | | 1/1 |
| 69 | 6 | SPORTS.PDF | 1 | GrayComposite | 3/27/99 | 10:02 | RST | 1056... | 38366948 | | 1/1 |
| 70 | 9 | LIFE.PDF | 1 | GrayComposite | 3/27/99 | 10:02 | RST | 1056... | 38366948 | | 1/1 |

Draft 1:
file=RST;size=1056000;name=D:\2\LIFE.PDF;FileName=LIFE.PDF;;Job=70;Device=38366948;page=1;dpi=300x300;width=2550;
height=3300;color=GrayComposite;bpp=1;linesize=320
Draft 1: ++++++++++++++++++++++++++++++++Gray/none
Draft 1:
file=RST;size=1056000;name=D:\2\NEWS.PDF;FileName=NEWS.PDF;;Job=68;Device=38366948;page=1;dpi=300x300;width=2550;
height=3300;color=GrayComposite;bpp=1;linesize=320;DraftRes=0;Drf_N=0,1,2,3,4,5,0,0;Drf_T=0,0,1,1,1,1,1000,1001;Drf_x1=941,815,496,
332,1496,1542,2320,0;Drf_y1=765,1908,803,803,1622,155,0,0;Drf_x2=1059,1176,-496,-332,824,0,0,0;Drf_y2=647,798,0,0,0,0,0,0;Drf
_txt="edit picture","Edit text","Insert period","Insert Period","Insert Period",LF,RF
Draft 1: 10

PREPRESS WORKFLOW METHOD USING RASTER IMAGE PROCESSOR

FIELD OF THE INVENTION

This invention relates to a method of configuring a prepress workflow that includes a raster image processor (RIP), and more particularly, this invention relates to a method of configuring a prepress workflow with a raster image processor using a graphical user interface.

BACKGROUND OF THE INVENTION

The prepress industry typically uses a number of different stand alone servers, such as a raster image processor, an OPI server having high and low resolution data, a scanning software module and other hardware and software components. These components typically are included on different software packages and must be set up with involved preparation, often on different computer systems. Typically each software program must be individually programmed, such as by bringing up the server based program and programming each of the different programs. This is inefficient and not desirable.

Additionally, the raster image processor may work with an open press interface and other modules, such as a trapping function, and will require difficult and unwieldily manipulation of various files in order to configure the raster image processor in conjunction with a prepress workflow. This is time consuming, and in a competitive environment, is not advantageous.

SUMMARY OF THE INVENTION

It is therefore an object of the present invention to provide a method of configuring a prepress workflow having a raster image processor (RIP) that is simplified in a visual, graphical user interface such that the raster image processor can be easily configured for the workflow.

In accordance with the present invention, a method now allows the configuration of a prepress workflow that includes a raster image processor (RIP). The method comprises the steps of loading a prepress memory manager on a local computer as a result of user input such that a graphical user interface is displayed on a computer screen and includes a prepress system design palette and a raster image processor (RIP) module icon that represents a raster image processor distributed object module that is used in the prepress workflow operation. The RIP distributed object module can be configured by user interfacing with the graphical user interface and the RIP module icon.

The method also comprises the step of dragging the RIP module icon from a modules toolbar into the system design palette. The RIP distributed object module can be configured by opening a RIP setup window. The RIP setup window is opened by clicking a mouse button when a pointer is entered on the RIP module icon. The method also comprises the step of entering within an entry line within the RIP startup window the amount of RAM designated to the RIP distributed object module at startup. The method also comprises the step of enabling an open prepress interface by clicking a box window contained within the RIP startup window. The method can also comprise the step of enabling an open prepress interface to store files to disk and allow the RIP distributed object module to process postscript file references to enhance speed of operation. The method can also comprise the step of invoking trapping within the RIP distributed object module by clicking a box window contained within the RIP startup window. The method can comprise the step of dragging module icons representing desired prepress hardware and/or software distributed object modules to be used in a prepress workflow and operative with the RIP distributed object module from a modules toolbar into the prepress system design palette. The module icons can be linked based on user input in the order which represents how the prepress workflow proceeds along the selected hardware and/or software distributed object modules represented by the module icons.

Module icons can also be enabled by a pull down menu and selecting appropriate prepress hardware and/or software distributed object modules corresponding to a desired hardware component and/or software function. The memory manager can be launched at a remote computer based on user input at the local computer and outputting the prepress workflow to an output device located at the remote computer.

A graphical user interface contained on a computer screen of a computer and used for establishing a prepress workflow is also disclosed and includes a prepress system design palette. A modules toolbar is operative with the system design palette. The modules toolbar contains module icons representing different prepress hardware and/or software distributed object modules that can potentially be used in a prepress workflow operation, such that the module icons can be dragged from the modules toolbar to the system design palette and linked together based on user input in the order which represents a desired prepress workflow. A RIP module icon is contained within the system design palette and representative of a raster image processor (RIP) distributed object module that can be used or selected for configuring the raster image processor distributed object module.

BRIEF DESCRIPTION OF THE DRAWINGS

Other objects, features and advantages of the present invention will become apparent from the detailed description of the invention which follows, when considered in light of the accompanying drawings in which:

FIG. 28 illustrates a setup operating window for an output module.

FIGS. 35, 36 and 37 illustrate a setup for printing drafts.

DETAILED DESCRIPTION OF THE PREFERRED EMBODIMENTS

The system and method of the present invention now allows an advanced digital prepress workflow to be established by dragging appropriate icons and linking the icons in the manner corresponding to the prepress workflow. The system and method of the present invention can realize unparalleled speed and throughput of jobs, but also a variety of options that provide precise and exacting control of all aspects of an existing computer system, such as a desktop portable computer, e.g., work station.

The invention provides a multi-tasking and multi-threading Raster Image Processor (RIP) that facilitates conversion of Adobe® PostScript®, Encapsulated PostScript® and Portable Document Format (PDF®) files to binary raster language. Operators can Spool/Print directly to the hard drive, freeing the workstation quickly. Data importing, ripping, spooling and printing occur simultaneously. The RIP can be working on the next page while the recorder is printing. The invention is also advantageous because a RIP becomes part of a graphical user interface for a prepress workflow system.

The digital prepress workflow system and method of the present invention (hereinafter "workflow system") incorporates a workflow manager for a prepress system. It can scan output of other RIP's and redirect the output to multiple devices within a system. It works seamlessly with files that have been processed on either Adobe or Harlequin RIP's. The workflow system can include several optional add-on modules that perform tasks such as remote system configuration, remote proofing, imposition, output of digital bluelines, output of composite proofs and many other functions. The digital prepress system uses both OLE (Object Link Embedding) and DCOM (Distributed Component Object Model) technology. With this combination, an operator is able not only to use simple drag and drop icons to set up a prepress workflow, but to also set up and control multiple remote sites from one central location. In addition, PostScript® Level III commands can be used.

Figure 1:
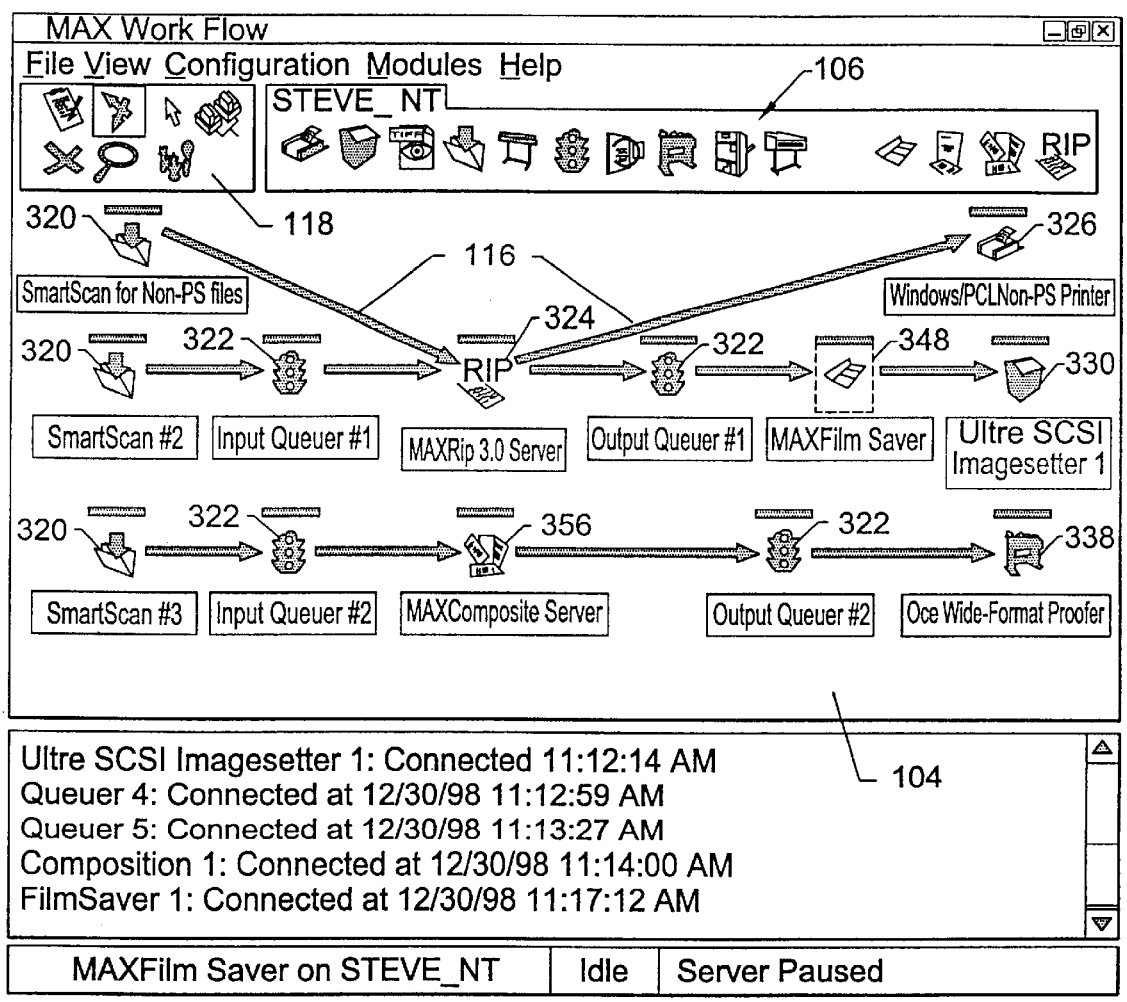
FIG. 1 illustrates a graphical user interface of the present invention showing the system design palette, a system and modules toolbar with various icons in the modules toolbar corresponding to prepress hardware and/or software distributed object modules.
Figure 2:
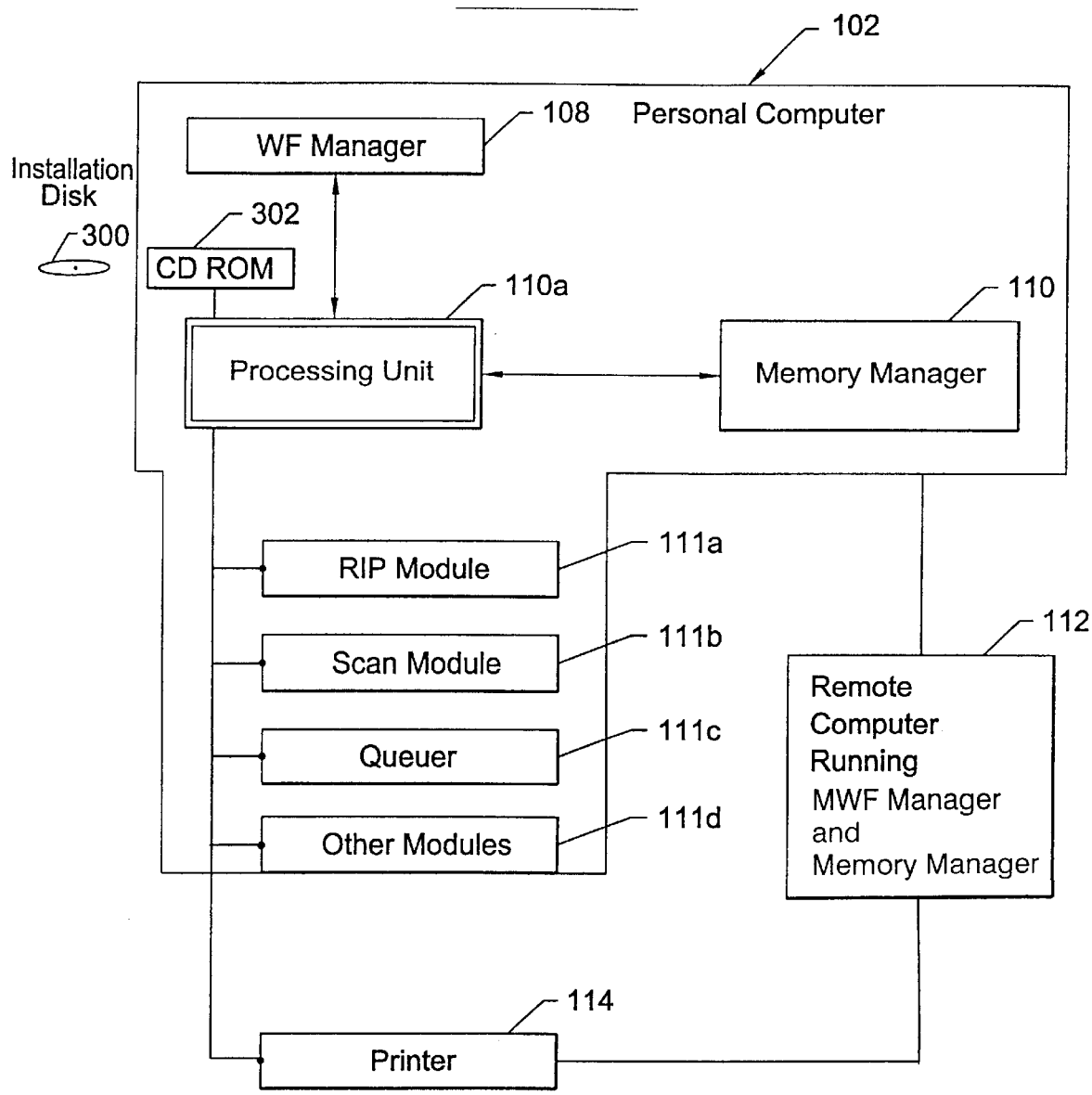
FIG. 2 is an overall block diagram of the workflow system of the present invention.

FIG. 1 illustrates a graphical user interface 100 for the workflow manager that is displayed after a prepress memory manager is loaded on a work station computer platform 102, such as a personal computer or other system hardware, as illustrated in FIG. 2. The graphical user interface 100 includes a prepress system design palette 104 and a modules toolbar 106 having module icons representing different prepress hardware and/or software distributed object modules that can potentially be used in a prepress workflow operation. As illustrated, module icons represent desired prepress hardware and/or software distributed object modules as will be explained below and are used in a prepress workflow and dragged from the modules toolbar 106 into the prepress system design palette 104.

As illustrated, the module icons are linked based on user input in the order that represents how the prepress workflow proceeds along the selected hardware and/or software distributed object modules represented by the module icons. Alternate paths could be available and an initial scan module acts as a "smart" or "intelligent" module for load control and controlling memory with available disk space and acts to direct data files to appropriate distributed object modules in the workflow based on the type of incoming data. At the personal computer 102, a workflow manager 108 and memory manager 110 are loaded and work with processing unit 110a. A RIP module 111a, scan module 111a, and queuer 111c are illustrated, together with other modules 111d. A prepress memory manager can also be launched at a remote platform illustrated at 112, based on user input at the work station platform 102 and the prepress workflow can be output to an output device located at a remote platform, such as a printer 114. In FIG. 1, graphical lines, as illustrated at 116, establish the link from one module icon to the next module icon with the system design palette representative of the prepress workflow and the linking among distributed object modules. The graphical lines 116 can be color coded and the color coded graphical lines can have a first visually distinguishable color when a successful link between module icons is established and a second visually distinguishable color when a link is rejected. For example, a good link could correspond to a blue arrow, while an improper link could correspond to a red arrow. A system toolbar 118 can include icons corresponding to system functions, as will be explained below.

The personal computer system or other work station that is used for the workflow system includes the memory manager 110 and workflow manager 108, such as seen with a graphical user interface and are operative with the processing unit 110a. The memory manager handles transmission of data in the background, not seen by an operator. Each module corresponds to a COM module, which in the present example, are distributed object modules. Because the modules are implemented as COM servers, the modules can reside on different computers, i.e., local and remote. Each module evaluates the type of data that an adjacent module in the workflow can handle, and can transfer data as necessary. This data transfer can be accomplished based on the type of terminal device, and what data it accepts. The composite description of the terminal device is transferred back to the initial scan module, which acts as a "smart" module, and determines the routing of data based on the type of data, especially if multiple work paths are available. Various modules, such as operative under various software distributed object modules, include the raster imaging processor (RIP) module 111a, a scan module 111b, a Queue module that acts as a Queuer 111c, and other modules 111d as known to those skilled in the art.

The scan module acts as an intelligent module and can arrange workflow through a predetermined work path based on the type of data. It can publish itself, acting similar to a printer, for example, a virtual printer. It also acts as a hot folder with a specific directory hard drive. An operator can print a file directly from the scan module. Because a composite description of a terminal device is obtained, the scan module can process data and transfer the data along a predetermined path based on the type of data.

The scan module also functions as a local controller. Some modules create temporary files and use disk space and memory. The scan module acts as an intelligent module and can scan disk space and memory to allow the processing of files based on the available disk space and the amount if available. The scan module can convert data based on terminal device memory requirements, such as converting the raster file to postscript.

The RIP module will inquire as to the device (i.e., the module) next to it, and the kind of data it is capable of processing, such as raster data or other type of data. The RIP module will save this information. What beneficial aspect of the present invention is the RIP module reflected in a graphical user interface for a prepress workflow. The RIP can be programmed as necessary based on operator use of the graphical user interface, as will be explained below. The RIP can convert data as necessary.

The RIP module can have OPI and trapping abilities. Large graphics can be stored on OPI module that is operative with the RIP module, while the RIP module is free to process postscript files without having the large memory photographs attached. The RIP module would process only postscript file references, while the OPI would save the large file to the local drive. The OPI module would be preferably connected to the "intelligent" scan module. The RIP module later could obtain the photograph file from the OPI storage location and transmit it to the final output.

As is well known to those skilled in the art, distributed object computing extends an object-oriented programming system and allows different objects (or components in a system) to be distributed across a heterogenous network. The components can interoperate as a unified whole and can also be distributed on different computers throughout the network. These components live within the module address space outside an application and appear as though local to an application. Different programs can be used as known to those skilled in the art including the Microsoft Distributed Component Object Model (DCOM), the Common Object Request Broken Architecture (CORBA), as produced by OMG, and the Java/Remote Method Invocation (Java/RMI). When a DCOM application is used, multiple interfaces can be supported, and a query interface method can be used to navigate among interfaces. A client proxy can dynamically load multiple server stubs in a remote layer and a remote server object can be identified through its interface pointer to serve as an object handle at run-time.

An interface can be identified using the concept of interface ID's (IID) and identify an implementation of a server object using class ID's (CLSID) with mapping found in the computer registry. An object exporter can perform a remote server object reference generation. A COM run-time system can allow object registration, skeleton instantiation and object remote procedure call (ORPC). Mapping of the object name to its implementation can be handled by the registry. A service control manager can locate an object implementation and activate the object implementation, depending on the IDL specification. All parameters can pass between client and server objects and are defined in the interface definition file. Depending on the IDL specifics, different parameters can be passed either by value or by reference. A pinging mechanism can allow unnecessary data to be collected, i.e., garbage data. The DCOM or similar system gives the program the ability to interface with the different modules and interface by identification number. Data can be converted based on adjacent distributed object modules.

Figure 3:
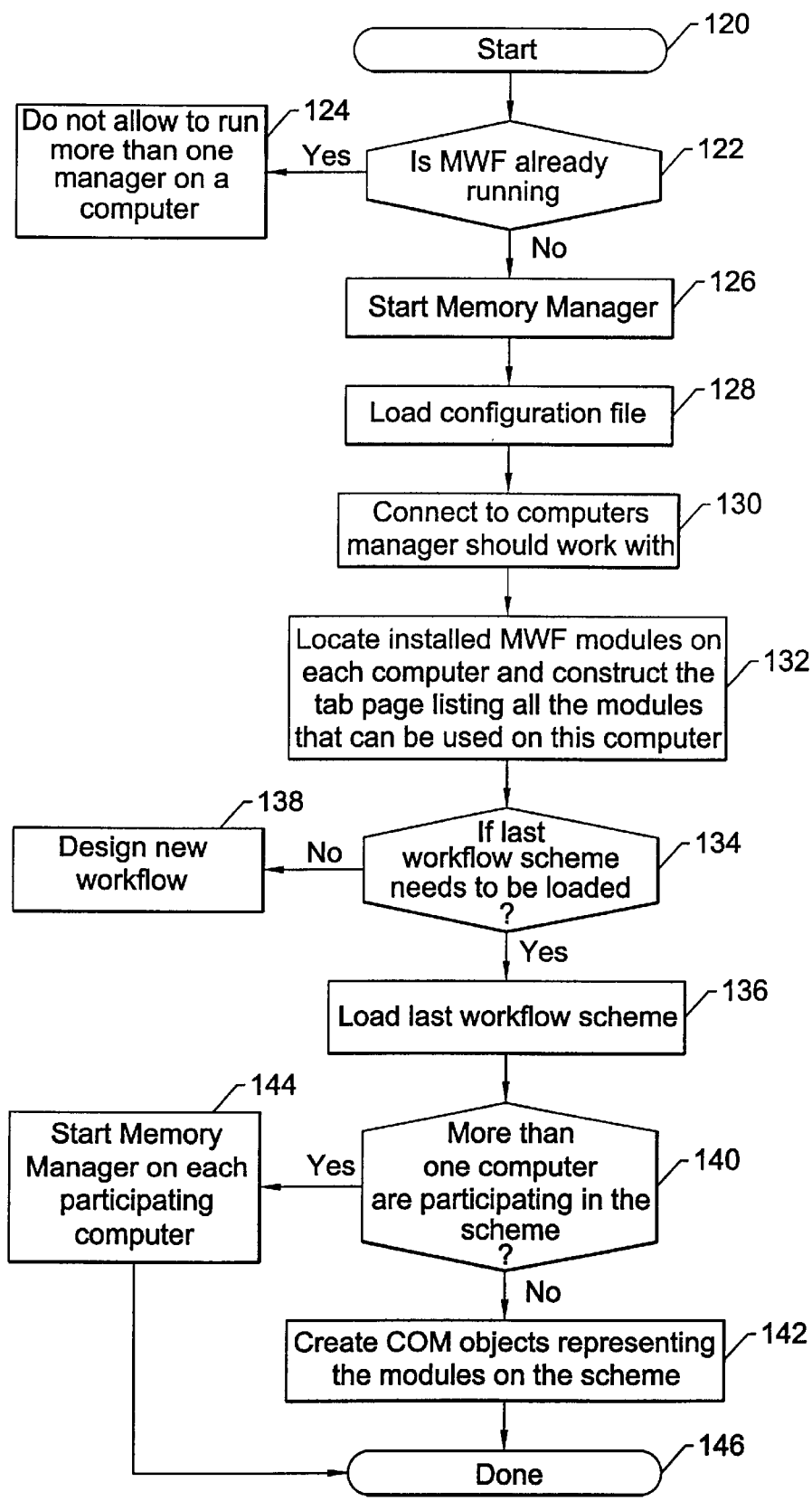
FIG. 3 is a flow chart illustrating the basic start-up sequence when starting the memory manager and creating COM objects.

FIG. 3 illustrates a flow chart depicting initial start-up of the workflow system. When the user initiates the program, the system starts (block 120). The system initially determines if the workflow system is running (block 122) and if yes, it will not allow more than one manager to run on a computer and will not load (block 124). Two workflow managers are not allowed to run on the system. If a workflow system is not running, then the memory manager is started (block 126) and a configuration file is loaded (block 128), such as dealing with color of screens, link tools, remote computers and other aspects not part of the linking in the system design palette. Different network computers are connected (block 130) and installed network workflow system modules are located and a tab page listing is constructed showing all the modules that can be used on the computer (block 132). The remote computers could be connected via a LAN or WAN.

The system determines if the last workflow scheme needs to be loaded (block 134), and if yes, then the last workflow scheme is loaded (block 136). In this step, an older workflow configuration file is loaded. Several lines of code are read, and COM based modules are located and picked up in the system with the proper programming and links. If not, then a new workflow is designed (block 138). If the last workflow scheme is loaded, then a decision is made whether more than one computer is participating in the scheme (block 140). If it is not, then COM objects are created representing the modules in the scheme (block 142). If more than one computer is participating, then the memory manager is started on each participating computer (block 144), and the program is done (block 146).

Figure 4:
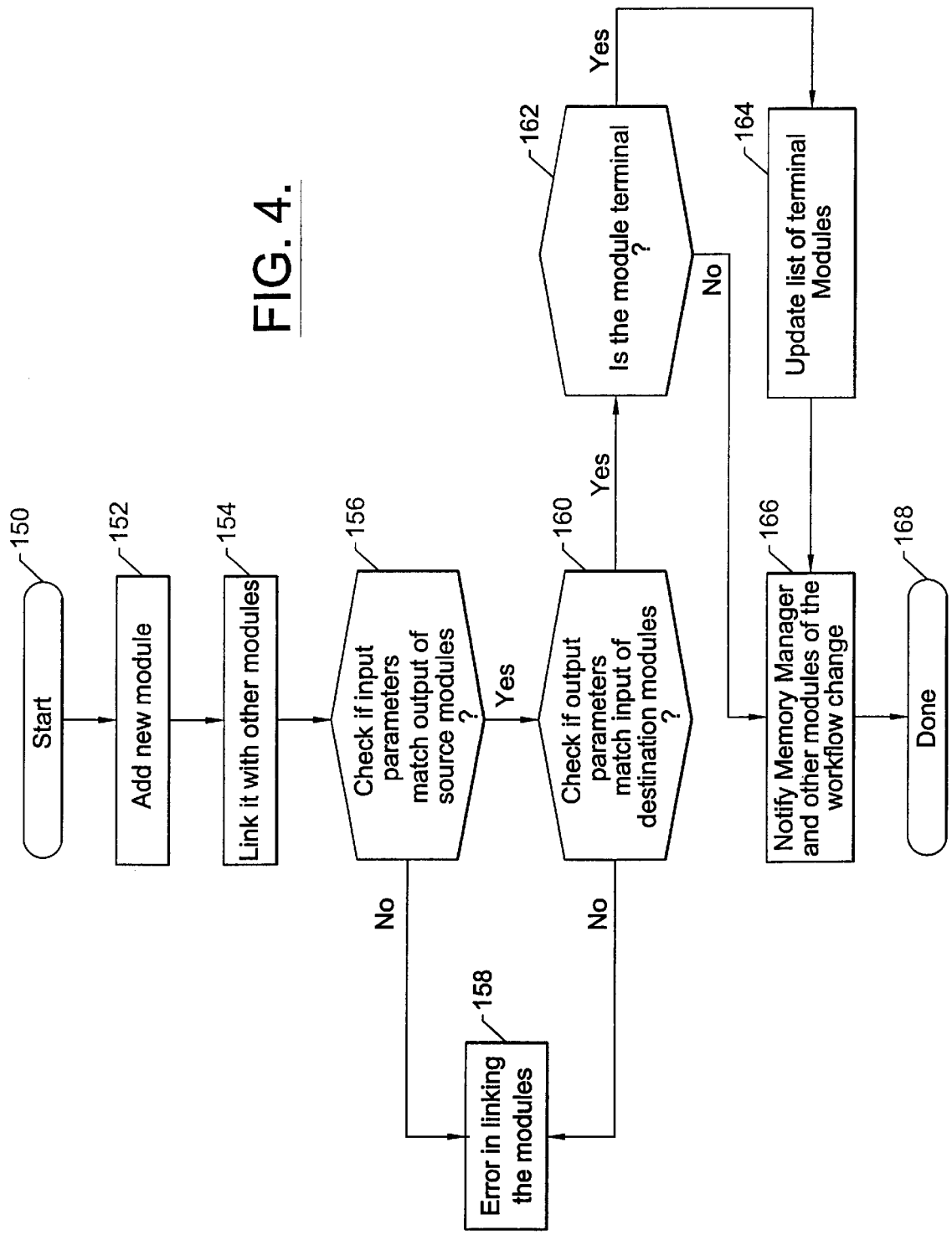
FIG. 4 is a basic flow chart showing the steps in the linking of module icons based on user input.

FIG. 4 illustrates the basic methodology used in linking modules. As shown in FIG. 4, the program starts (block 150). New modules are added based on user choice and needs (block 152) and linked with other modules (block 154). At this time, input parameters are checked to match outputs of the source modules during the linking process (block 156). The linking tool has innate intelligence and is a "smart" tool. If the parameters do not match, then there is an error in linking the modules, such as forming a red line arrow (block 158). This error could be for a redundant link or connecting improper software and/or hardware modules. If the input parameters check and the output parameters match the input of the destination modules (block 160), then the system determines if there is a terminal module (block 162). If there is a terminal module, then the list of terminal modules is updated (block 164) and the memory manager and other modules are notified of the workflow change (block 166). In some cases, until the proper beginning workflow is created, the workflow system will not allow linking to the terminal device. The scan module acts as a hot folder and maintains a record of terminal devices each time a terminal device module is dropped in the system design palette. If the module is not terminal, then the memory manager and other modules are notified of the workflow change (block 166). The program is done (block 168).

Figure 5:
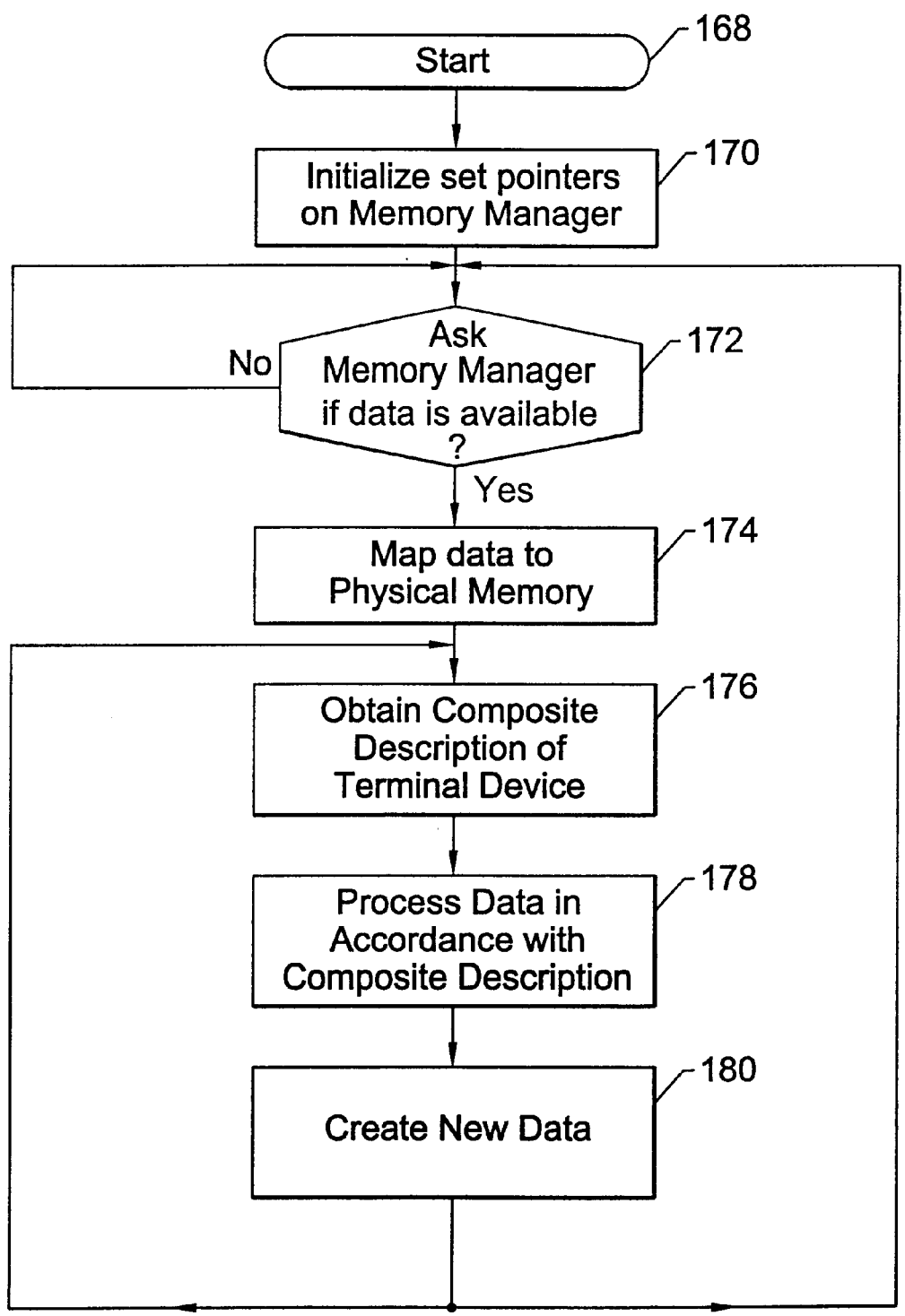
FIG. 5 is a flow chart illustrating data delivery and formation in the workflow system of the present invention.

FIG. 5 illustrates a basic data generation and flow within the workflow system of the present invention. As illustrated, the program starts (block 170) and the set pointers are initialized on the memory manager (block 172). The memory manager is asked if data is available (block 174). If data is not available, then the loop occurs. If data is available, then the data is mapped to physical memory (block 176) via the scan module that acts as a "smart" scan folder, which has shared memory with the memory manager, and then the composite description of a terminal device is obtained (block 178), relating to the setup of the respective terminal device. The data is processed in accordance with a composite description (block 180) and new data is created (block 182).

Figure 6:
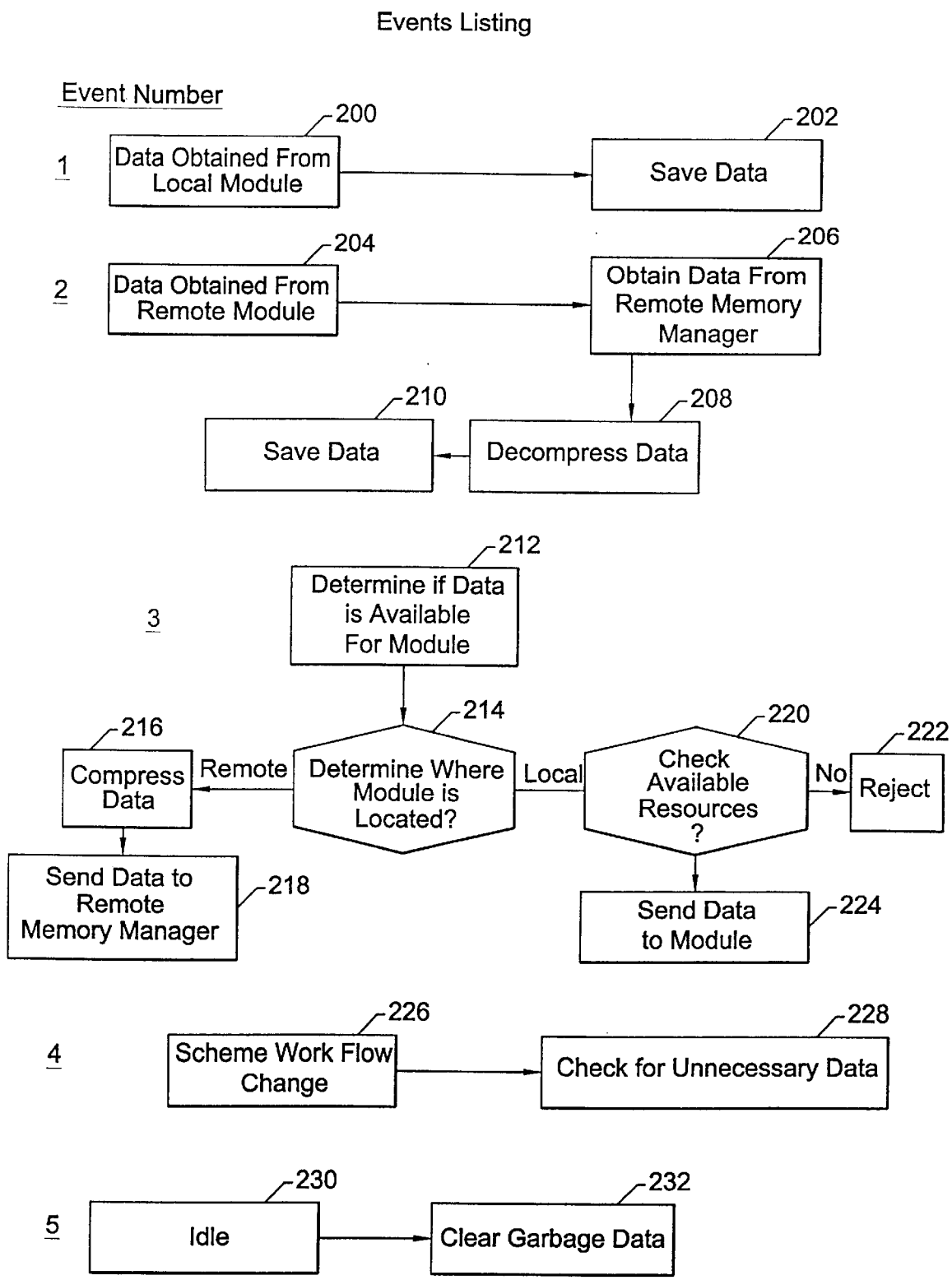
FIG. 6 is an example of an events listing for the memory manager.

As shown in the flowchart of FIG. 6, the memory manager takes different pieces of data and redirects them to other modules. There are two modules in this example, one remote and one local. A series of different events can occur as the workflow system progresses. For example, if data is obtained from a local module (block 200), then that data is saved (block 202). At event 2, data could be obtained from a remote module (block 204) and then data obtained from the remote memory manager (block 206). The data is decompressed (block 208) and the data saved (block 210). At event 3, the workflow system determines if data is available for the module (block 212). The location of the module is then determined (block 214). If the location is remote, the data is compressed (block 216) and the data is sent to the remote memory manager (block 218). If the location is local, then the available resources are checked (block 220), and if there are none, then the data is rejected (block 222), otherwise, the data is sent to the module (block 224). At event 4, the workflow may change (block 226) and unnecessary data is checked (block 228). At event 5, an idle system (block 230) will allow garbage data to be cleared (block 232).

The initial set up of the workflow system of the present invention on a personal computer 102 running a program such as Microsoft Windows is straightforward. Many of the described steps would be well known to those skilled in the art. The corresponding drawing figures aid in understanding further details. A workflow installation system disk 300 containing the data and instructions for the computer program of the present invention is inserted into a computer's CD-ROM drive 302. An operator clicks on the Start button typically located at the bottom left of the screen. Next, the operator clicks on the Run command. From the Run menu, the operator types in the letter assigned to the CD-ROM and Setup.exe.

Clicking on the Next button, the operator will be prompted for a user Name and a Company name in a User Information window. Once this information is completed, the operator clicks on the Next button. The software automatically defaults to a desired directory in a choose destination location, for example, C:\MWF, corresponding to Max Work Flow™, such as sold by Harris Publishing of Melbourne, Fla. If the operator desires to load the software on a different drive, the operator clicks on the Browse button to view different drive locations. This will pull up a Choose Directory window that features drives available, as well as network drives. If the operator wishes to map to a network drive, the operator clicks on a Network button at the bottom of the window. A Map Network Drive window will come up next. Once the operator has selected the proper destination for installation of the workflow system, the operator clicks on the Next button.

A Setup Type window appears next. Three different setup options can be offered, e.g., Typical, Compact and Custom. Typical would load all the common options of the workflow system and is recommended for most scenarios. Compact setup loads only the minimum options required for proper installation of a basic package. Custom setup allows advanced users the opportunity to pick and choose certain add-on, optional modules they wish to install. The operator clicks a left mouse button in a radio button next to the setup option the operator desires, and then clicks on a Next button.

A window prompts the operator to select a folder for the installation of program icons. It will default to whatever directory the operator has assigned. The operator clicks on the Next button and a Start Copying Files window will pop up. Within this window, the operator would see a set up type, target folder, user's name and company name information. If all of this information is correct, the operator clicks on the Next button. If the operator wishes to change anything, the operator clicks on the Back button and keeps clicking on Back until the operator reaches the window offering the information he wishes to change.

The computer subsequently and automatically begins decompressing files from the CD and copying them to the selected drive and directory. Upon completion of this process, icons will be created.

The software program can be launched at this time. A Sentinel Driver is installed and a registry update is completed. When imagesetters are to be driven, the operator can install a low level imagesetter driver at this time. If the operator is planing to install a Windows printer, or redirect output to existing Windows printers, a Print Port is installed at this time. After all options are installed, the Server can be rebooted so the installation can be completed. A registry update is performed and the software registers individual modules into a Windows Registry system. An imagesetter driver can be installed to properly drive the imagesetter(s).

An MWF (or similar depending on design) program icon is clicked to initially begin the program. The memory manager 110 as workflow manager 108 are loaded. A System Design Palette 104 is opened as a window (FIG. 7) as part of a graphical user interface 100. Proper use of the System Design Palette 104 enables an operator to completely configure the prepress system workflow and configure each individual piece of hardware being used. The drag and drop functionality of the system makes this a very simple operation that can be quickly accomplished.

The module toolbar 106 and system toolbar 118, which can be customized to operator preferences, are typically featured. In addition, as is the case with all Windows-based applications as is well known to those skilled in the art, there are pull-down menus that can be used to accomplish the same tasks as usage of the various tool icons. The pull-down menus also provide shortcut keys if the operator is more keyboard than mouse-oriented.

Figure 7:
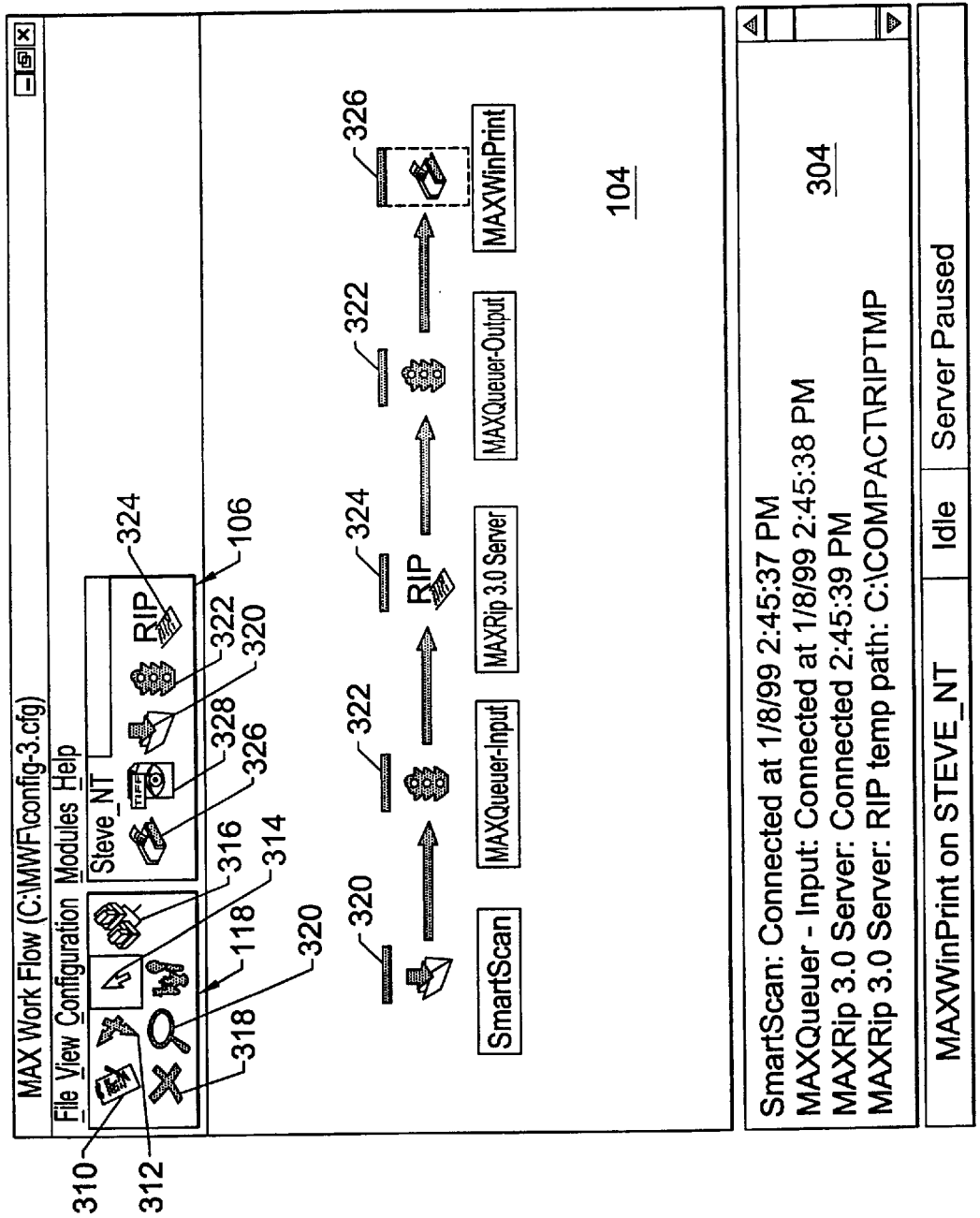
FIG. 7 is another view of the graphical user interface showing a workflow that has been established on the system design palette.

Various pull-down menus can be used, as shown in FIG. 7. A first function listed under the File menu can be a Start/Stop System command. The keyboard shortcut for this command could be F2. Once the system is started, the menu command changes to Stop System. Using the F2 key is the same as a toggle switch. The first time this toggle is used could turn the system on. The second time it is pressed could turn the system off.

The second function offered under a File menu is the Options command. From the System tab of the Options command, operators can automatically load the last configuration used and stop the system if an error is made in linking system components. Additionally, operators can change the dots per inch (dpi) of file Preview. It is recommended that the Preview dpi be set at 36 dpi. If an operator needs a higher resolution for preview files, the resolution can be set at 72 dpi. At this time, the operator would have the ability to create a system wide Logfile. This logfile contains information on all modules activities throughout the system.

Another option offered under the File menu is a Desktop tab. This function allows an operator to change the colors already assigned for linking, desktop and selected object components within the System Design Palette. Also, operators can opt for different sized module icons, whether or not the module name will be shown and whether or not to show a log and remote icon.

A network tab can be featured under the File menu. Operators can quickly see existing Servers on the network LAN or WAN and can add or remove Clients as desired. To add a client, an operator would click the add button and find a Server that has the MWF Client software loaded.

Under a View menu, operators can view log files, such as those shown at the bottom section 310 of the System Design Palette 304. A keyboard shortcut for this command could be Ctrl+V. The log could show job progress and history of system operation. By either clicking on the Modules Toolbar command or pressing Ctrl+M, operators can eliminate the modules toolbar at the top of the screen.

The Control Toolbar, which can also be activated by pressing Ctrl+C, eliminates display of the System Toolbar 118 featured at the top left of the palette window. By default, all the views come up when the application is invoked. By using any of the above commands, the operator can eliminate the log 304 or toolbars 106, 118 from the System Design Palette 104.

One of the benefits of turning off the System and Modules toolbars 106, 118 is the enhanced security. Once the operator has the workflow set up and configured and saved, the operator can turn off both of the toolbars. As a result, other personnel cannot make any changes to the existing workflow as it is set up.

The last command under the View menu enables operators to switch icon size of modules represented by icons in the System Design Palette 104. The keyboard shortcut for this command is F7. When clicking on this command, the icons displayed will either increase or decrease in size, based upon which size you presently have displayed. There are three sizes available—small, medium and large.

The Configuration menu allows for setting up and saving a new configuration of the workflow system, or the opening of an existing system configuration. To create a new configuration, an operator can click on the New command, or use the Ctrl+N keyboard shortcut.

To open an existing configuration, an operator clicks on an Open command, or presses Ctrl+O. An operator may have one saved configuration, or many, based on needs and preferences. An operator highlights the existing configuration (.cfg) file the operator wishes to open and clicks on the OK button to open the choice of existing configurations.

To save a new configuration, an operator clicks on Save, or uses the Ctrl+S keyboard shortcut. To rename a saved configuration, the operator clicks on the Save As command, or presses Ctrl+E. A window prompts the operator for a file name in the File name text window. The operator keys in the name of choice, then clicks on the Save button.

The Modules menu allows for the control and setup of various components of the workflow system and the overall workflow system. To pause the workflow system, an operator clicks on Pause, or Ctrl+P. The following module commands require a module to be highlighted first, which is accomplished by clicking on the module icon within the System Design Palette.

To delete a module, an operator clicks on Delete or press the Delete key. To setup, the operator clicks on Setup or presses the F5 key. To view, the operator clicks on View or uses the F4 keyboard shortcut. To select a remote computer, the operator clicks on Change Computer or uses the F6 command. To log on or off the system, the operator clicks on the command, or uses Ctrl+L as a keyboard shortcut. To select all modules within the palette, the operator clicks on Select All under the menu or presses Ctrl+A.

Seven icons are featured in the upper left-hand corner of the System Design Palette in the System toolbar 118. These icons replicate functionality afforded by pull-down menus for those operators which prefer to employ icons rather than menus.

The notebook and pencil icon 310 at top left of the system toolbar is the Log On/Off switch. Keyboard shortcut for this function is Ctrl+L. This command turns on the log file for a selected module, within the system workflow. When the log file is on, the operator will see it at the bottom of the System Design Palette screen. The operator will also see a small notebook icon appear at the lower left of the selected module icon. The icon acts as a toggle switch. If the operator does not wish to view a Log file for the selected module, the operator presses the icon a second time. It will then turn the Log file off. The log file shows the activity history of the module represented by the icon.

The blue arrows icon 312 is used to custom-link various components of the prepress workflow system once the operator has chosen icons representing the components workflow. The operator uses the New Link command to click on an icon that starts the workflow and then clicks on the icon where the work needs to flow. Using the left mouse button click once on the module, the operator clicks on the second module etc, until workflow is finished.

If an operator tries to connect two components that cannot be properly linked, the link arrow will appear red instead of blue and the operator will be prompted with an error message. At that point, the operator can go back to the System Toolbar window, click on the Pointer tool, then left-click on the red arrow and delete the link.

The icon third from left, a white arrow pointing upward, is the pointer tool 314. With this tool, the operator can select various icons from the palette. In addition, the icon performs as a toggle switch. Once the operator has completed linking of the system with the New Link (blue arrows) tool, the operator clicks on the pointer tool to turn off the New Link tool.

The icon representing networked computers 316, which is located at the very top right of the icon group, enables an operator to launch the workflow system on a remote system 112. This function can also be accomplished by pressing the F6 key as a keyboard shortcut.

The lower left-hand icon, represented by a red X 318, is used to delete objects. An operator highlights a device icon placed on the System Design Palette and presses the Delete icon. The same function can be accomplished by pressing a Delete key on the keyboard.

The magnifying glass icon 320, shown second from left in the System Toolbar icon group, enables operators to setup objects. An operator clicks on the object within the System Design Palette 104 which the operator desires to configure, and then clicks on the magnifying glass icon 320. A window will then pop up prompting the operator for input of various information necessary to the proper operation of individual components within the overall workflow. A GO Button turns the system on, and allows an operator to toggle the system from GO to STOP.

A Modules Toolbar 106 features icons which, when in place on the System Design Palette, will represent various hardware components of the system, as well as software functionality. Actual module icons are illustrated in the Modules Toolbar shown in FIG. 7. The illustrated module icons are only representative icons of different object oriented modules. Other modules can be incorporated as known to those skilled in the art.

Five icons are illustrated in the system module toolbar. A scan module 320 acts as a hot folder for scanning incoming files. A Queue module 322 is used to queue files to the various components such as a raster image processor (RIP) module 324 or to an output device, such as a printer module 326. A Tiff module 328 is represented by an icon, which features an eye within a page. Linking this icon into the workflow system allows an operator to write Tiff files to disk, or print to file.

The Print module 326 controls an output device. If an operator desires to output to two or more devices, additional modules can control whatever output device has been added. The print module 326 used in this example can be a Windows (PCL) printer and Imagesetter devices.

Figure 8:
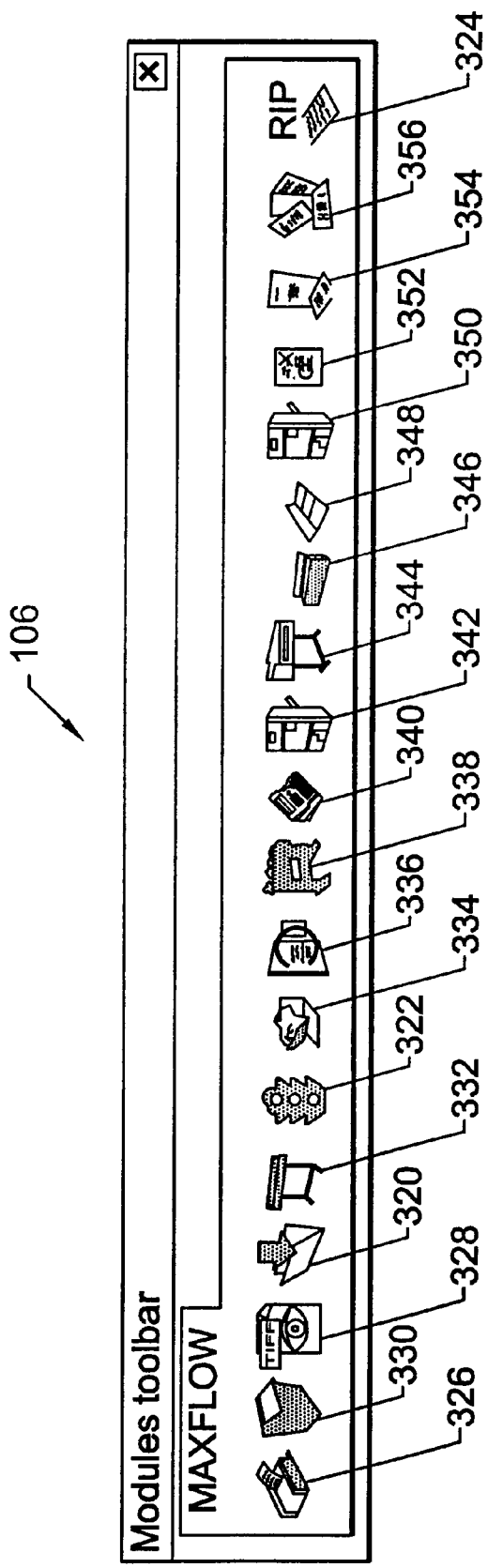
FIG. 8 is an enlarged view of a modules toolbar showing 19 different module icons corresponding to prepress hardware and/or software distributed object modules.

Other modules as shown in FIG. 8 can be used. The system can quickly configure customized workflows, regardless of complexity and number of components. An operator drags all the necessary icons into the System Design Palette, highlights an individual icon, right clicks the mouse and a window pops up. The operator is then prompted to input the exact specifications and parameters. In the system design palette, a scan module 320 is connected to a queue module 322, the RIP module 324, another Queue 322 and a print module 326.

The icon for the print module 326 represents various Windows printers available on the network. When an operator drags this icon from the toolbar onto the System Design Palette, it is ready to be configured with the specifications of whatever type of device the operator may have in the workflow system. Operators can output Postscript™ or PDF files to PCL or other Non-PostScript® Windows printers.

Scanning modules 320 may also be referred to as hot folders. Once an operator has placed the scanning module 320 within the System Design Palette 104, the operator can then program this module to set up directories and scan for incoming files, set up backup directories, program buffer sizes, and many other functions. It then queues these files to the next component in the workflow system. As all component modules, this module can be renamed to whatever the operator desires. This module can also be published out onto the network in both Macintoshes and PC as printers to the user.

The Queue module 322 queues various jobs to the appropriate component, such as a raster image processor module (RIP) 324, an output device 326, or both, as illustrated. Native intelligence has been programmed into the Queue module 322 enabling it to determine the proper path a certain file should take within the workflow system. The Queue module 322 will automatically route files to the appropriate module, based on the nature of the file. The module also serves as a buffer and allows for viewing of file log information, previewing of files, and holding jobs for proofing first.

The Raster Image Processor (RIP) module 324 is a key core component of the workflow and converts Postscript® language or Encapsulated Postscript® files to raster data at increased speeds. In addition, the RIP module handles an Adobe® Portable Document Format® (PDF) workflow, ripping them in their native format, and works seamlessly with all PostScript® Level III commands.

Actual module icons shown in a Modules Toolbar window may vary from what has been shown in the illustrated toolbar. The displayed icons represent the specific functions an operator wanted with the workflow system. An example of the type of module icons and the corresponding hardware and/or software modules are shown in FIG. 8. From left to right, the module icons represent:

Printer module 326—Access Windows printers local or remote.

SCSI ImageSetter module 330—For complete configuration of a SCSI imagesetter.

Tiff Module 328—as described in the basic set up above.

Scan module 322—As described in the basic set up.

Ricoh module 332—Allows for control and configuration of a Ricoh output device.

Queue module 322—as described in the basic set up above.

LoadBalancer module 334—Balance the load of files coming into the system.

OPI module 336—Affords Open Prepress Interface (OPI) functionality within the existing workflow system, as opposed to running files through a separate OPI server. With this module, an operator can control all aspects of OPI, directories for high- and low-resolution files to be placed in, and other instructions and details known to those skilled in the art.

Proof module 338—Control and configuration of a 36" wide-format high-speed black & white proofing device, as an example.

Imposition module 340—Impost postscript/PDF pages automatically within the workflow system.

ImageSetter module 342—Allows for control and configuration of an Imagesetter output devices.

HP module 344—Allows for control and configuration of a Hewlett-Packard plotter.

Fuji module 346—Allows for control and configuration of a Fuji output device.

FilmSaver module 348—Allows rotation and placement of files to minimize output film/paper waste.

RCRM SCSI module 350—For complete configuration of an ECRM SCSI imagesetter.

RemoteProof module 352—Send soft proof in raster format for approval remotely.

RasterDownSampler module 354—Down-samples dpi of Tiff file for Rip-Once proofing. In digital prepress circles, this is known as ROOM technology, which stands for Rip-Once-Output-Many.

Composite Server module 356—Allows for color-separated files to be stitched back together and output as a composite proof. It will also convert color-separated raster files into a print file. Print file can then be output as a composite proof in color, black & white, or multiple burn black plates for version checks. Any plates can be mixed and matched.

Rip module 324—As described in the basic setup.

Other modules (not shown) could include a HTML module that rips postscript pages to HTML; an EPSOptimizer module for optimizing postscript or EPS for optimal use; and a PreFlight module that balances the load coming into the system.

The workflow system of the present invention allows for quick and easy design of a custom prepress workflow tailored to an operator's specific needs. The operator can link each and every individual component of the existing workflow system and do it in such a way as to maximize productivity and performance.

A first module typically required in any workflow is a scan module 320. Once in place, the scan module 320 can act as a hot folder to scan for incoming files on a directory of the operator's choice, who clicks once on the icon within the Modules Toolbar 106, and then drags it into position within the System Design Palette 104. The operator clicks once again and places it within the palette. Should the operator wish to move this or any other icons the operator has positioned, the operator clicks on the icon with the white arrow pointer tool 314 and drags it to the desired location. The operator is typically given the opportunity to name this module as the operator desires.

To link the scan module 320 to the Queue input module 322, the operator would click once on the Queue icon, which is represented by a traffic light in the Modules Toolbar 106, drag it into the system design palette 104 and click again to place it. As was the case with the scan module icon, the operator drags the Queue module icon 322 anywhere on the palette, as long as the operator has the pointer tool selected.

Figure 9:
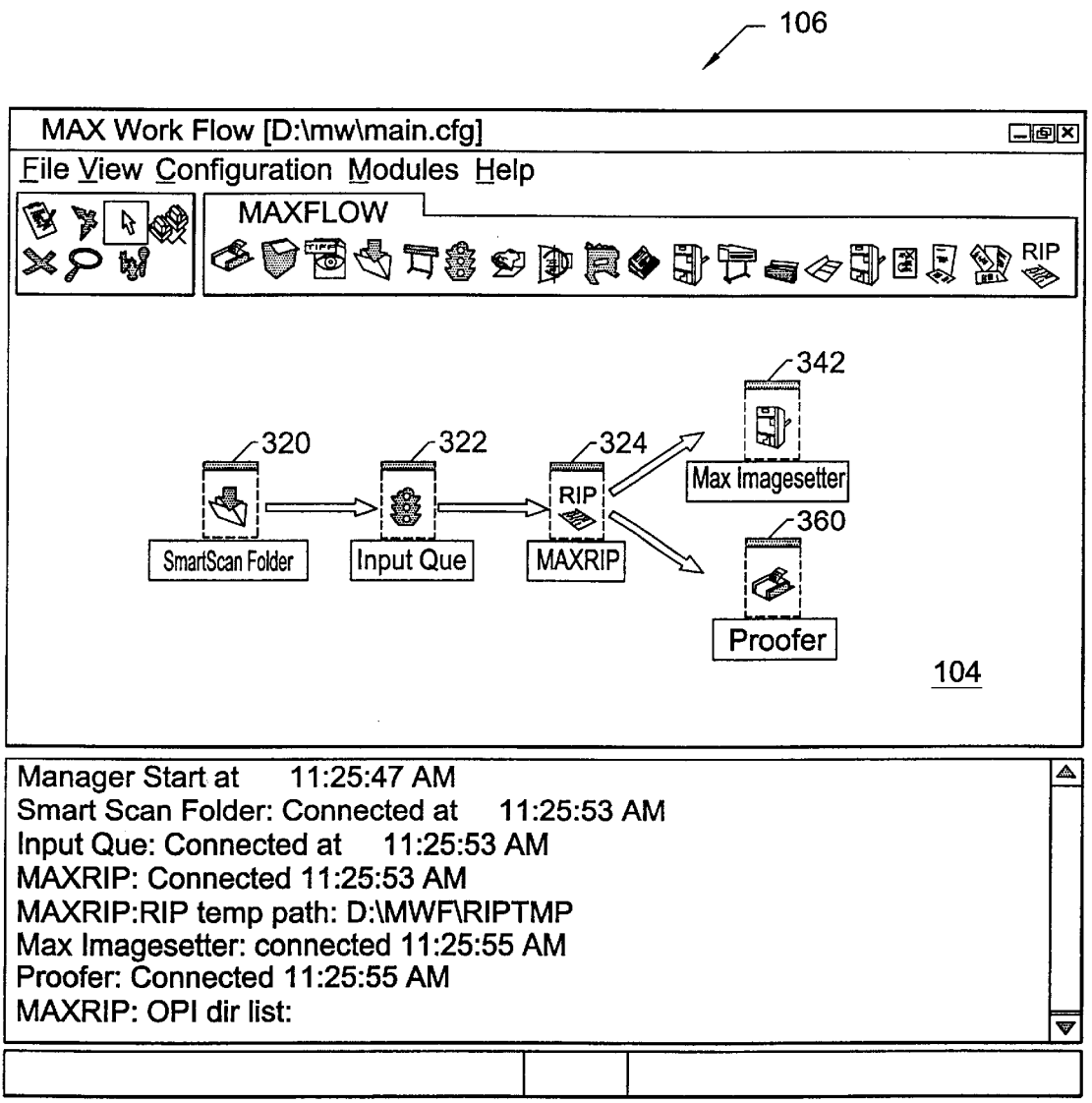
FIG. 9 illustrates a sample system workflow established in the system design palette with an imagesetter and proofer as terminal devices.

In the sample workflow displayed in FIG. 9, the RIP module 324 is the next step in the workflow configuration. The operator clicks once on the RIP module icon 324 within the Module Toolbar 106, drags it into the desired position within the system design palette 104, and clicks once to place it into the workflow.

The operator can place a Queue module 322 next in the workflow procession for trafficking jobs to be output. The Queue module 322 allows for a smooth flow of job traffic by routing files to the next module. However, it is not necessary to place a queue between the RIP and output device.

In the sample System Design Palette window shown in FIG. 7, an Ultre SCSI Imagesetter module 342 and a windows printer 360 are the output devices of choice, as represented by the icons. Several different output device drivers could be available based on which drivers are used for specific workflow needs.

To place any of these icons within the workflow, the operator clicks once on the specific icon within the Modules Toolbar 106, drags it into the desired position within the System Design Palette 104, and clicks once again to place the module within the workflow.

The next step in creation of a custom workflow is to link each individual module, whether it represents a software function, or a hardware component within the workflow system. The operator clicks on the New Link tool 312 (blue crossed arrows) in the system toolbar 118 to convert the cursor to a linking tool. Next, the operator clicks once on the first icon in the workflow and then to the next icon the operator has placed within the palette to represent system components. The operator clicks once on that icon to connect the first two, then clicks on the next. The operator continues doing so until the operator has linked each component of the system for the desired workflow scenario.

If the operator attempts to make a link that is not possible, the blue link arrow will change to a red arrow and an error connecting message will prompt the operator to rethink the decision. Should the operator wish to change a certain link that is already chosen, the operator clicks on the white arrow to convert the cursor into a pointer tool. The operator highlights the particular link by pointing to it with the cursor and right clicking on the mouse. When doing this, it will change to a turquoise color. The operator will then be given an option to delete or setup. If the operator wishes to delete the link, the operator clicks on the delete command. The link will then be erased entirely and the operator may re-link appropriately. Although the colors of objects can be changed to suit any individual taste, the default link arrow color is blue. When the operator highlights it with the pointer tool, it defaults to turquoise. The different connected modules are listed in the window 304.

After all modules within the System Design Palette 104 are linked appropriately for a desired workflow, the operator chooses a final output module(s), such as through a scan module 320 and associated folder with destination modules.

Figure 10:
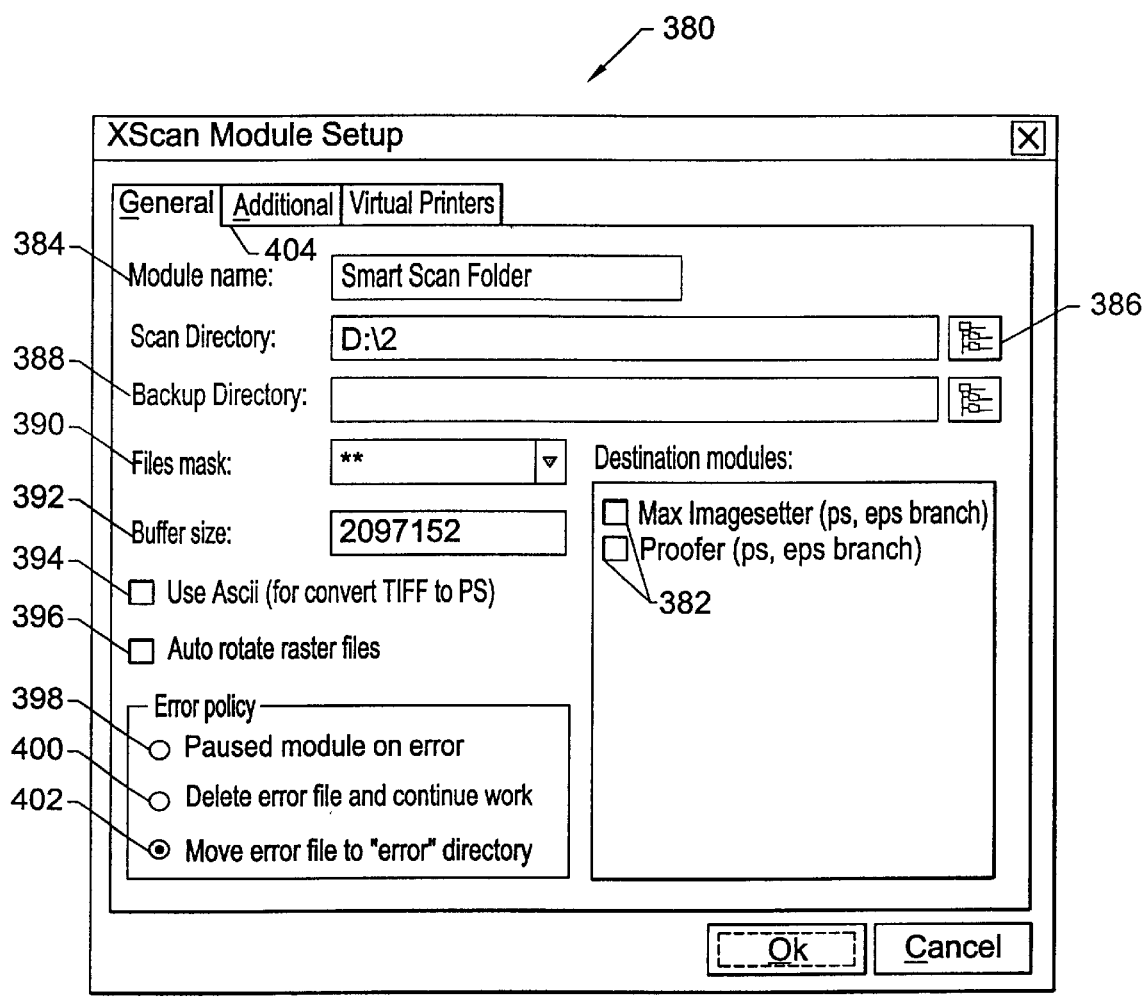
FIGS. 10, 11, 12 and 13 illustrate scan modules setup windows.

In a Window shown in FIG. 10 at 380 for the necessary scan module set up, the different output destination modules that the operator has placed in the particular workflow will be listed. However, they will feature a box 382 to the left of them, which is blank inside upon initial setup within the System Design Palette 104. The operator can click once on the box to activate the output device within the workflow. When the operator does this, a checkmark will appear and multiple output modules can be used to send files.

As noted before, a module is selected with a cursor. By right clicking the mouse button, the operator initiates configuration of any individual system. Right clicking on the icons will prompt a menu. With this menu, the operator highlights a desired command, or uses an appropriate keyboard shortcut next to the command. A pop-up menu can offer commands for Setup (F5), View (F4), Change Computer (F6) or Delete (Del). The RIP module 324 could include a menu having a Fonts command.

To program a component, the operator can either highlight the Setup command or press an F5 key with the module selected, as shown in FIG. 10.

The Module Name dialog box 384 allows changes to the module's name. Two options designate the directories the module will scan and backup to. The operator may either click within the text window and key in the directory path of the operator's choice, or click on the Directory Tree button 386 to the right of the text window. If the operator clicks on the Directory Tree button 386, a window allows the operator to scroll through directories, as well as to select different drives available on the system. The window could also display all files in a highlighted directory folder. If a directory is not empty a message could appear "Selected Scan Directory C:\dir Chosen is not empty Are you sure you want to process all files in this directory?"

The same procedure can be used to define a Backup Directory 388, which is a text window in the Module Setup window illustrated in FIG. 10. This information can be keyed directly into the window on the Directory Tree chosen to bring up a Select Directory window and select a directory of choice. A Backup Directory allows users to move files into the workflow system and make copies to use elsewhere.

The Files Mask (Files *.*) text window 390 in a scan module setup window has a pull-down menu, which will display various types of file formats available to pick. Whatever file masks the operator selects are the types of files scan module will locate as the files come into the workflow system. These files include PS, EPS, TIFF, BMP, PDF, PRV and DAT. It is possible to default to all file types by using the star-dot-star (*.*) command.

A Buffer size window 392 provides an operator the opportunity to designate a buffer size for the spooling of files. Buffer size can be defined by clicking within a window and keying the figure in. In one application, the buffer size defaults to slightly more than 2 mb standard for 128 mb RAM system. If system RAM increases, then buffer size can be increased, 4 MB for 256 mb RAM, 8 mb for 512 mb RAM, etc.

Other functions available include the ability to select Use ACSII 394 for conversion of TIFF files to PostScript® files or to Auto rotate raster files 396. The command to turn on or off the choice is made by clicking an appropriate box. A checkmark in the box means the function is turned on. The system defaults to having both functions off.

Through appropriate boxes, the operator can select Paused module on error 398, Delete error file and continue work 400, or Move error file to "error" directory 402, by clicking in a radio button next to the desired command to determine what to do with error files that may be encountered in the workflow.

Destinations appearing in appropriate boxes will be determined by the modules and devices within the workflow system. The operator selects the devices the operator desires to have the files sent to in the particular folder.

Figure 11:
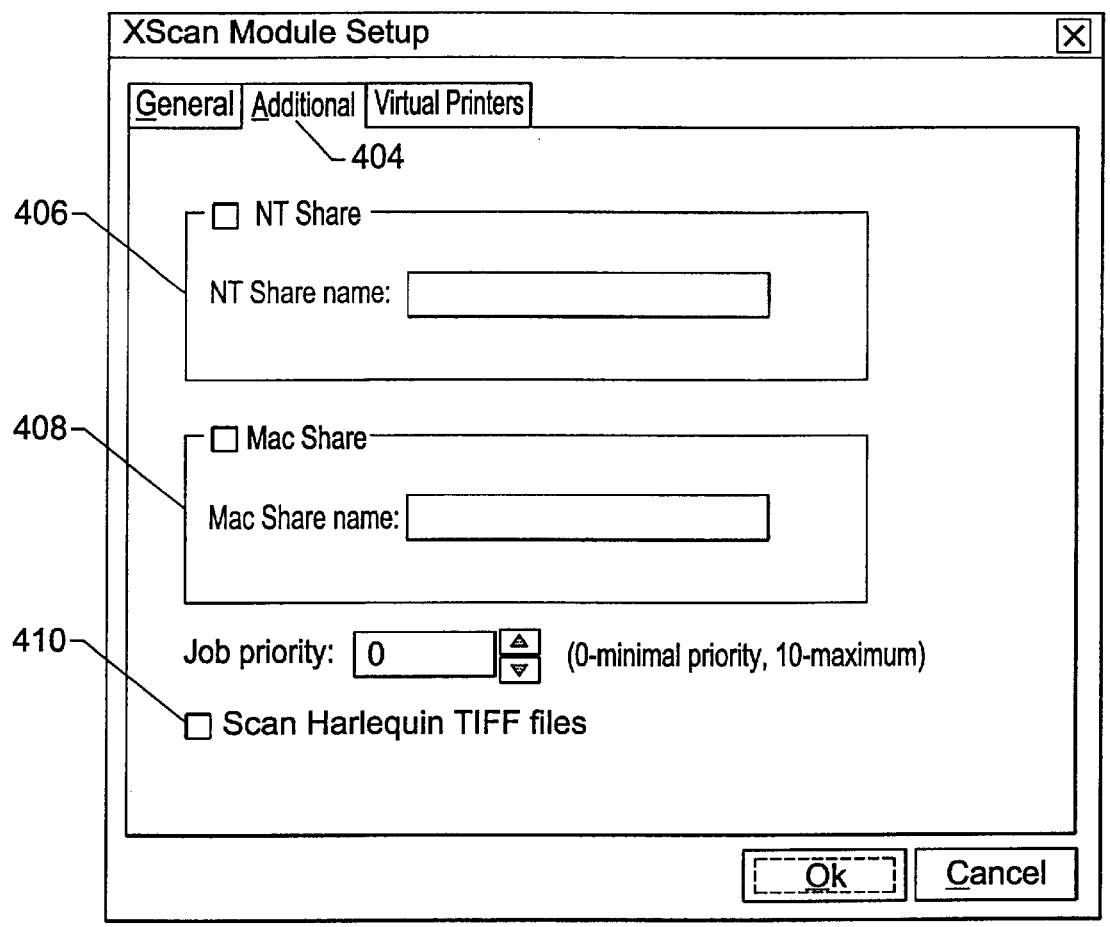

An Additional tab 404 can be selected within a scan module setup window (FIG. 11) to define hot folder sharing information 406. The operator also has the opportunity to turn Mac Share off or on 408. If turned on, a Mac Share name command will be highlighted and the operator is prompted to enter a name into the text window. Services for Macintosh must be running. The scan folder must be on an NTFS formatted drive. Also an operator can give the scan folder a higher priority within this folder by picking up raster files from the Harlequin RIP 410.

Figure 12:
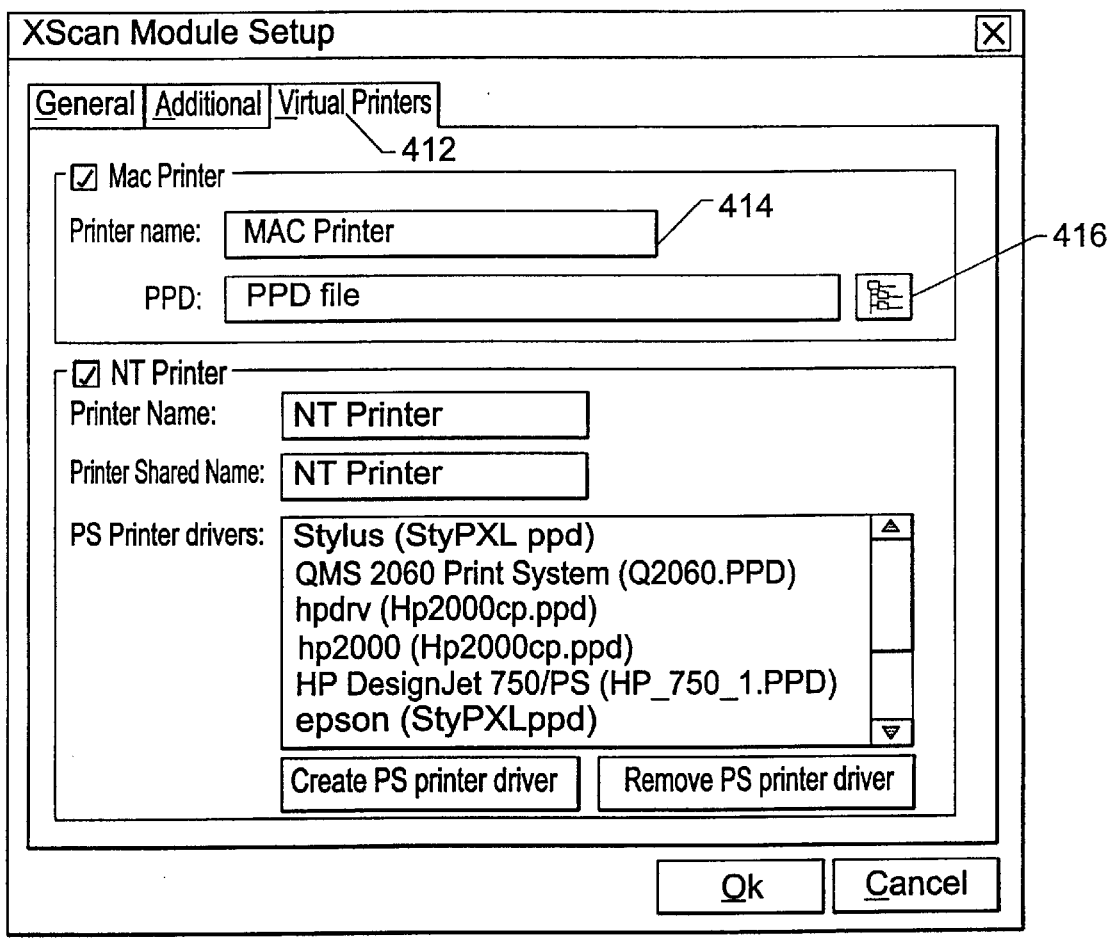

A Virtual Printers tab 412 (FIG. 12) can define virtual printer information. At the top of this window you can turn on the scan folder as a Mac Printer 414, define its name, and publish this name on a Macintosh chooser level. A PPD text window 416 displays the directory of the particular PostScript® Printer Description (PPD) file.

Rulers can be generated to allow users to make adjustments to the leading of different machines.

Figure 13:
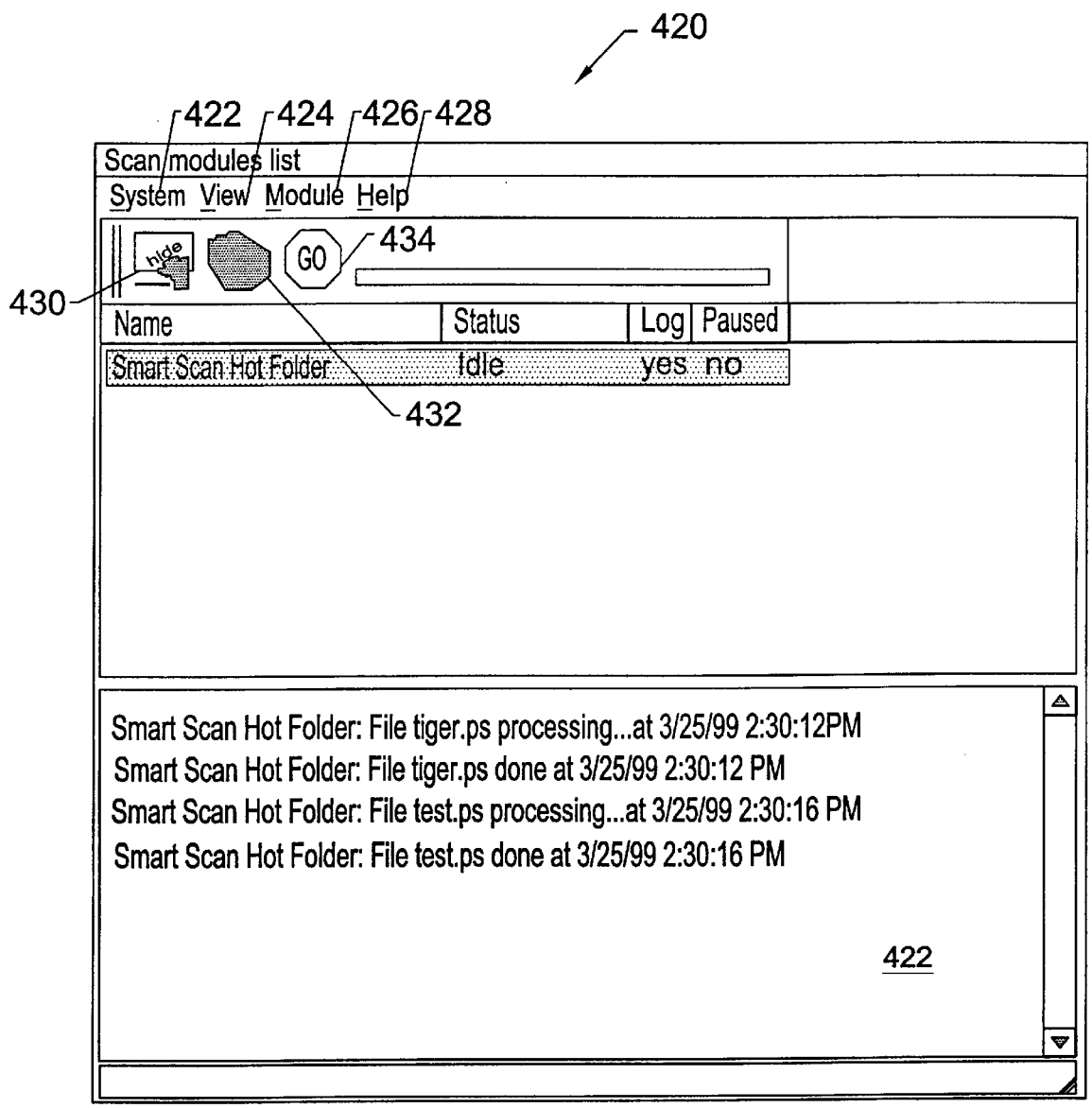

A Scan Modules List window 420 (FIG. 13) provides a history as to the module's activity. It will list each file that comes into scan module under the Name tab, the Status of each file as it progresses, if the information was logged and whether the module is paused or not. The log information recorded will be displayed in the text window 422 at the bottom of a Scan Modules List window. If multiple scan modules are in place within the workflow, the operator will see information detailing each within the window.

Pull-down menus include System 422, View 424, Module 426 and Help 428. From the Systems menu 422, the operator can stop the module by one of two different commands. The operator can highlight and click on Stop, or press the F2 key. Another command available under the Systems menu allows the operator to Exit the Scan Modules list window. From the View menu 424, the operator can hide or display both the Log Window and the Toolbar. To toggle the viewing of the Log Window on or off, the operator presses Ctrl+V. To toggle the viewing of the Toolbar on or off, the operator press Ctrl+T, or the operator can highlight either command with the mouse and left-click once.

From the Module pull-down menu 426, the operator can pause, set up or delete the scan module, or turn its log on or off. In addition, clicking on About Job will provide information on a highlighted file within the module.

Keyboard shortcuts for commands from within the Module pull-down menu are as follows: Pause=Ctrl+P, Setup=Ctrl+U, Delete=Ctrl+D, Log On/Off=Ctrl+L and About Job=Ctrl+J.

The hide icon button 430 at the top left of the Scan Modules List window will hide the entire window when it is clicked. All windows are interconnected to the System Design Palette.

The middle icon 432 gives the operator the ability to cancel a job. The operator can select the job in the log file, highlight it and click on the Cancel Job icon. The third GO icon 434 is Toggle On/Off switch. The Toggle switch works the same in every module. A GO SIGN is indicative when the workflow system is running and the STOP SIGN is indicative when the system is paused. The bar shown to the right of the Toggle switch, is the Progress Bar.

It is possible to activate remote servers that are listed. The listing could show what software is available.

Figure 14:
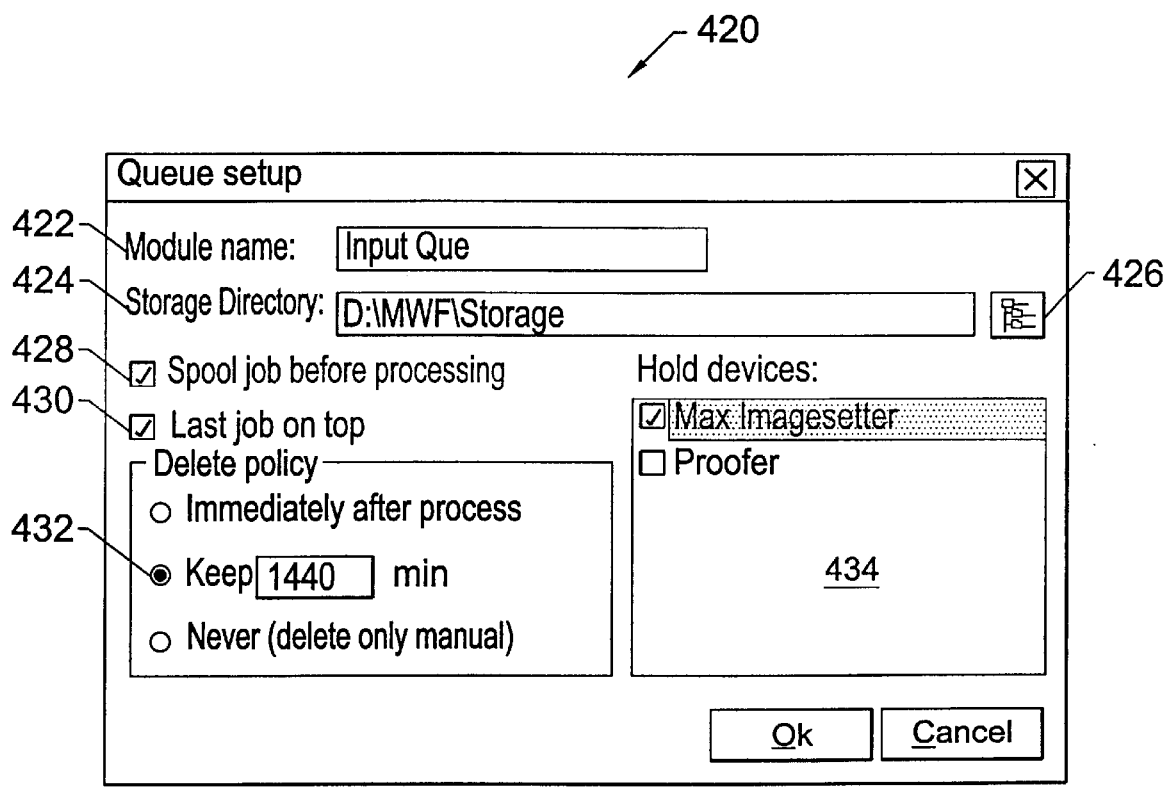
FIGS. 14 and 15 illustrate queue module setup windows.

It is possible to configure a Queue module 322 for either input or output (FIG. 14). In fact, it is possible to set up multiple input and output queues, based upon particular needs, all within one configuration. The operator drags and drops as many icons representing Queue modules as needed into the System Design Palette.

As was the case with the Setup window for the scan module, a Queue setup window 420 appears (FIG. 14). The operator is given the option of renaming the queue module by keying in a new name in the Module name text window 422, such as Input Que.

Underneath the Module name text window is a window for Storage Directory 422. If the operator already knows the directory path of where the operator wishes to store files, the operator keys key it in, or if the operator prefers, the operator may click on the Directory Tree button 426 and visually scroll through directories to select a storage directory.

When the operator opens this window, the Spool job before processing command 428 defaults "on." It will automatically spool a job before processing. If the operator does not wish to spool a job before processing, the operator clicks the mouse in the box window to the left of the command and the checkmark disappears. At that time, the queue module will start immediately sending data to the next module when received Last job on top box 430 is also checked on default, allowing for last job in queue to be place on top of list.

The Delete policy box 432, offers two choices as to when to delete a file, or a third option telling the module to never delete the file automatically. If the operator desires to delete a file immediately after it is processed, the operator clicks on the radio button next to that command. A dot will appear, signaling that the command is turned on. If the operator desires to maintain a file for a certain length of time, the operator clicks the radio button next to this command and keys in how many minutes the operator wishes to keep a file after processing. If the operator does not want automatic file deletion at all, the operator clicks on the Never command. Once this is invoked, the only way a file can be deleted is for the operator to go to the storage directory and manually delete the storage file itself.

In the Hold Devices window 434, output devices within the system workflow will be shown. If the system is queuing to only one device, that device will be listed and by default, it will be unchecked. To activate it, the operator clicks within the box and a checkmark will appear. If the system has multiple devices, one can be selected.

Once the operator has entered the desired information within this window, the operator either clicks on the OK button (Ctrl+O is keyboard shortcut). If the operator wishes to cancel information, the operator clicks on the Cancel button (or uses the Ctrl+C keyboard shortcut).

Figure 15:
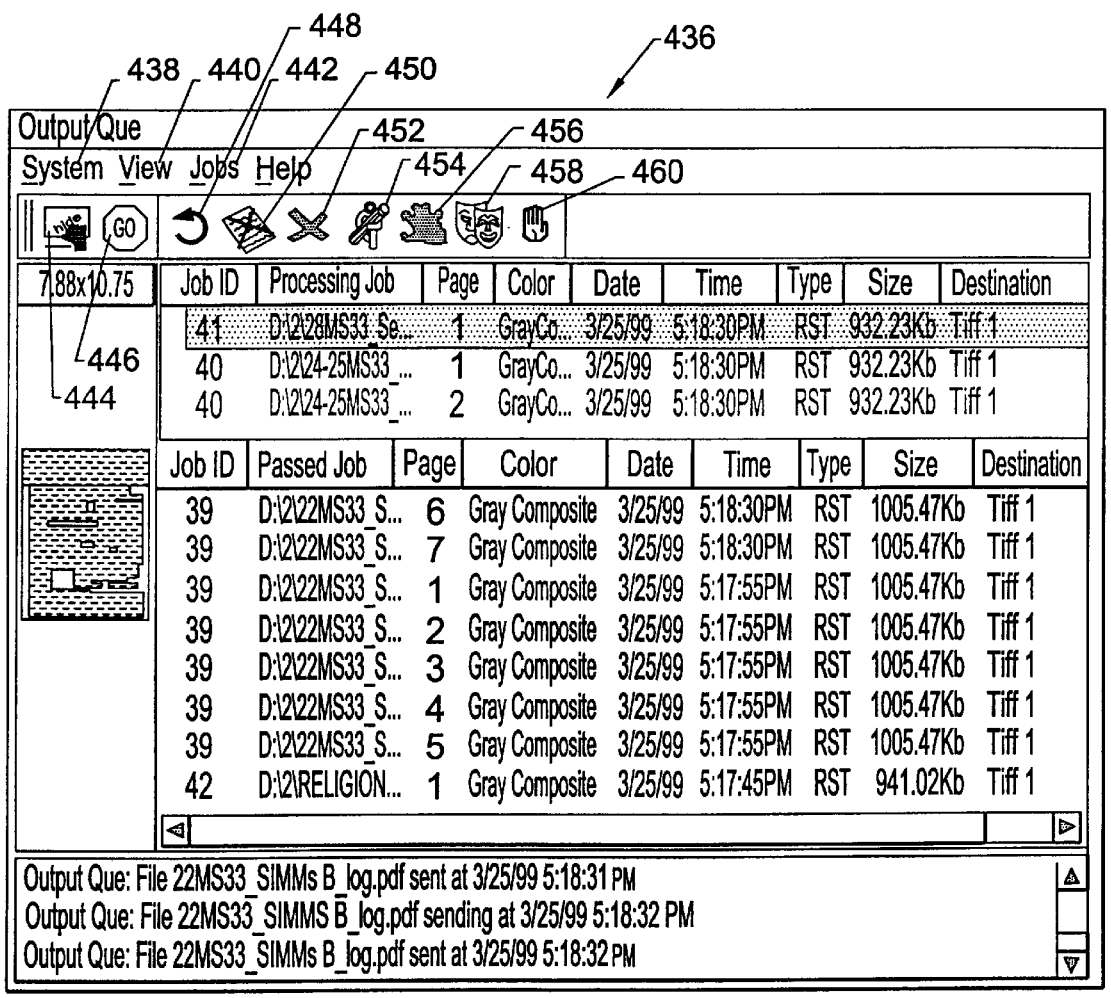

Another function provided within queue set up is the View window 436 (FIG. 15). Highlighting an Input Queue module icon and right clicking on the mouse pops up the setup menu with the View command being one of several options. The View window 436 of queue module shows a variety of very important data regarding workflow.

Within the Queue View window, additional commands and options are available. Under the Systems 438 pull-down menu, the operator can start or stop the module by either clicking once on the command (it toggles back and forth, based on whether the system is on or off at the time) or using the F2 keyboard shortcut. The Options (Ctrl+O) command pops up the Queue Setup window discussed earlier. Exit closes the View Window altogether.

In the View command 440, clicking on the command itself or using the Ctrl+V keyboard shortcut, allows the user to view or turn off view of Processing jobs (Ctrl+F), Passed jobs (Ctrl+E), Preview window (Ctrl+P), Log window (Ctrl+V) and Toolbar (Ctrl+T).

Valuable data is shown within the window. It gives the operator a quick overview as to what is taking place as far as jobs coming into the Queue module from the scan module. It also provides data on ones that have already been processed and forwarded on to the next step in the workflow.

Also available within the Queue view window is a Jobs menu 442. Pulling it down offers several different functions for control and flow of jobs including: Reprocess=Ctrl+R, About Job=Ctrl+J, UnHold=Ctrl+U, Delete=Delete, Save As=Ctrl+S, Change Names=Ctrl+H and Select All=Ctrl+A.

Icons shown within the queue module view window replicate many of these functions. To Hide or Show the main window (toggles back and forth), click on the first HIDE icon 444 on the left. To pause or resume the module, toggle, utilize the GO/STOP icon 446. To Reprocess selected jobs, select the job(s) one wishes to reprocess and click on the third icon 448 from the left. Highlighting a job and clicking on the fourth icon 450 from the left will Abort it. To Delete selected jobs, highlight the job description and click once on the fifth DELETE icon 452 from the left. Changing selected job names (Change Names) is accomplished by highlighting the job, then clicking on the Pencil icon 454. Clicking once on the third hand icon 456 from right will un-hold that job, or change the priority of a job with the second face icon 458 from the right. Place jobs on hold for processing later with the far right hand stop icon 460.

Right-clicking your mouse on the queue icon within the System Design Palette 104 opens a Setup menu, including Change Computer (F6) command. This command affords the ability to run the queue module on a computer at a remote site. When the operator invokes this command, the operator will see a window having the names of the Servers and Domain names, which can be selected.

The RIP module rips Adobe® PostScript®, Encapsulated PostScript™ and Portable Document Format (PDF) files at high speed. Open Prepress Interface (OPI) and Trapping are built-in functions. An operator does not have to run a file through an OPI Server and a separate trapping application in addition to ripping.

When right clicking the mouse on the RIP Module icon 324 within the System Design Palette, a menu will pop up offering five commands, four of which being identical to the menu offered when right-clicking on any of the other icons. These functions include View, Change Computer, Delete and About. The RIP module also offers the opportunity to see a window detailing what Fonts are available on the system. Fonts can be deleted and added to the system as known to those skilled in the art.

Figure 16:
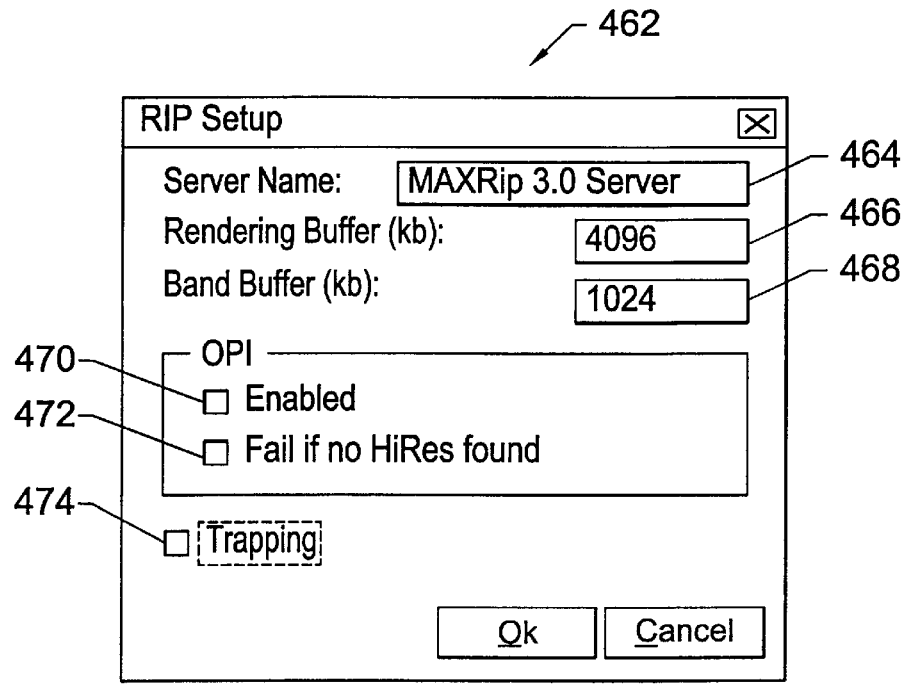
FIGS. 16 and 17 illustrate raster image processor (RIP) setup windows.

When clicking on the Setup command for the RIP module, the RIP setup window 462 in FIG. 16 will appear.

The text box window at the very top of the RIP Setup (Server Name) window 464 allows the operator to rename the RIP server. Rendering Buffer kb 466 allows the operator to select the amount of RAM designated to the RIP at start-up, the RIP will consume more RAM if needed while processing data. The band buffers (Band Buffer kb 468) pertains to the amount. If the operator desires to use Open Prepress Interface (OPI) capabilities inherent in the system, as opposed to having to transmit files to a separate OPI server, the operator clicks in the box window 470 next to enabled. Check the RIP to fail in OPI if no high-resolution files are found or process low-resolution file 472. Trapping of spot colors is also available. To invoke automatic trapping, click on the box window 474 next to that command. When the operator initially opens this window 462, OPI and Trapping will default to being turned off and the figures shown in the illustration above will be defaults for rendering and band buffers.

Once the operator has entered the correct setup information for the RIP, click on OK (or Ctrl+O). If the operator feels that something has been entered in error, the operator may click on Cancel (Ctrl+C) or go back and highlight the erroneous information and replace it with correct information.

Right clicking your mouse on the Fonts command on the RIP icon, a fonts window will appear, which will list actual fonts loaded on the workflow system. Fonts can be added and deleted as known to those skilled in the art.

Figure 17:
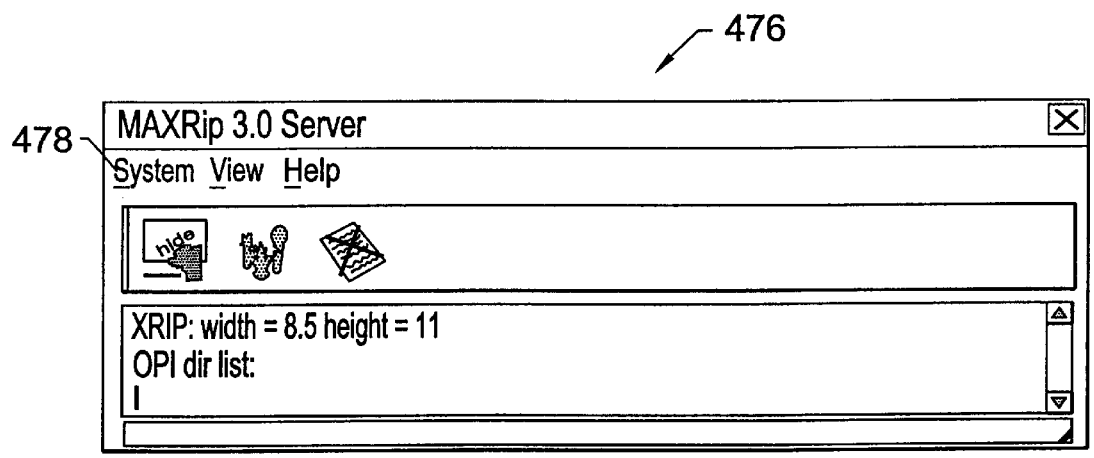

When invoking the View command from the menu displayed after right clicking on the RIP module icon, the server window 476 shown in FIG. 17 will appear. Three pull-down menus are available within this window. When pulling down the system menu 478, the operator can Start the RIP, click on Options (which will take you back to the Setup window) or Exit the window.

In the sample workflow illustration, a Queue Output module is located between the RIP module and a WinPrint module. Configuration of a Queue module used for output is the same as one used for input. Naturally, an output Queue is not necessary.

Figure 18:
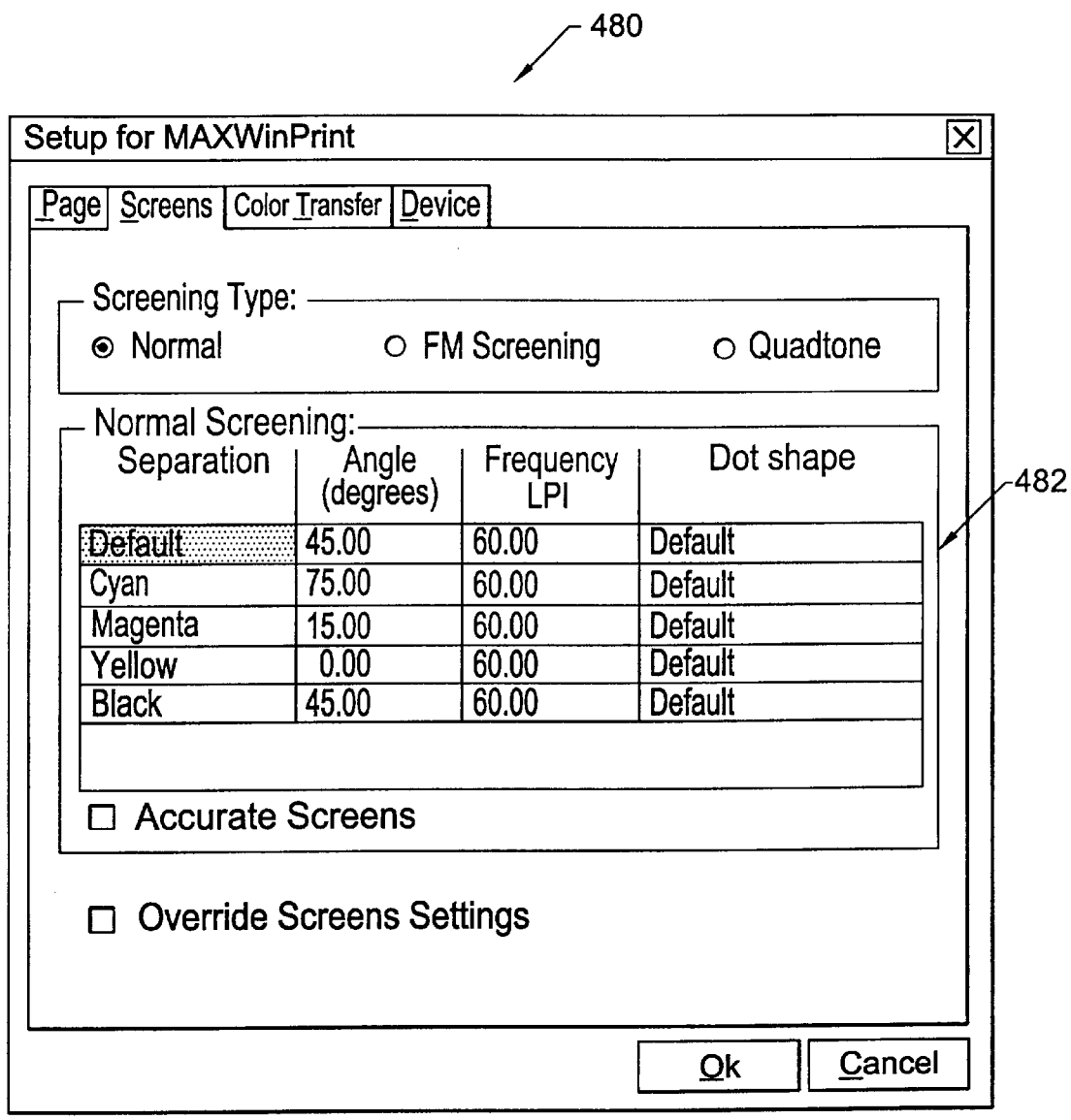
FIGS. 18, 19 and 20 illustrate setup windows for WinPrint modules.

The WinPrint module is illustrated as an output device in the workflow and can be configured as other modules by left-clicking the mouse to highlight the icon, then right-clicking the mouse to bring up a pop-up menu, having various commands such as: Setup (F5 keyboard shortcut), View (F4 keyboard shortcut), Clear Error, Launch Module, Change Computer (F6 keyboard shortcut), Delete (Delete keyboard shortcut), and About Module (Ctrl+F1 keyboard shortcut). The setup command allows set up of pages as is known to those skilled in the art and brings a setup window 480 as shown in FIG. 18. These can include mirror or negative output, resolution, scaling, page adjustment and screening information. Screening choices include Normal, FM or Quadtone. Under the Normal Screening display 482, an operator could input variables for Separation, Angle of output screens, Frequency LPI (lines per inch on output) and Dot Shape, as shown in FIG. 18.

Figure 19:
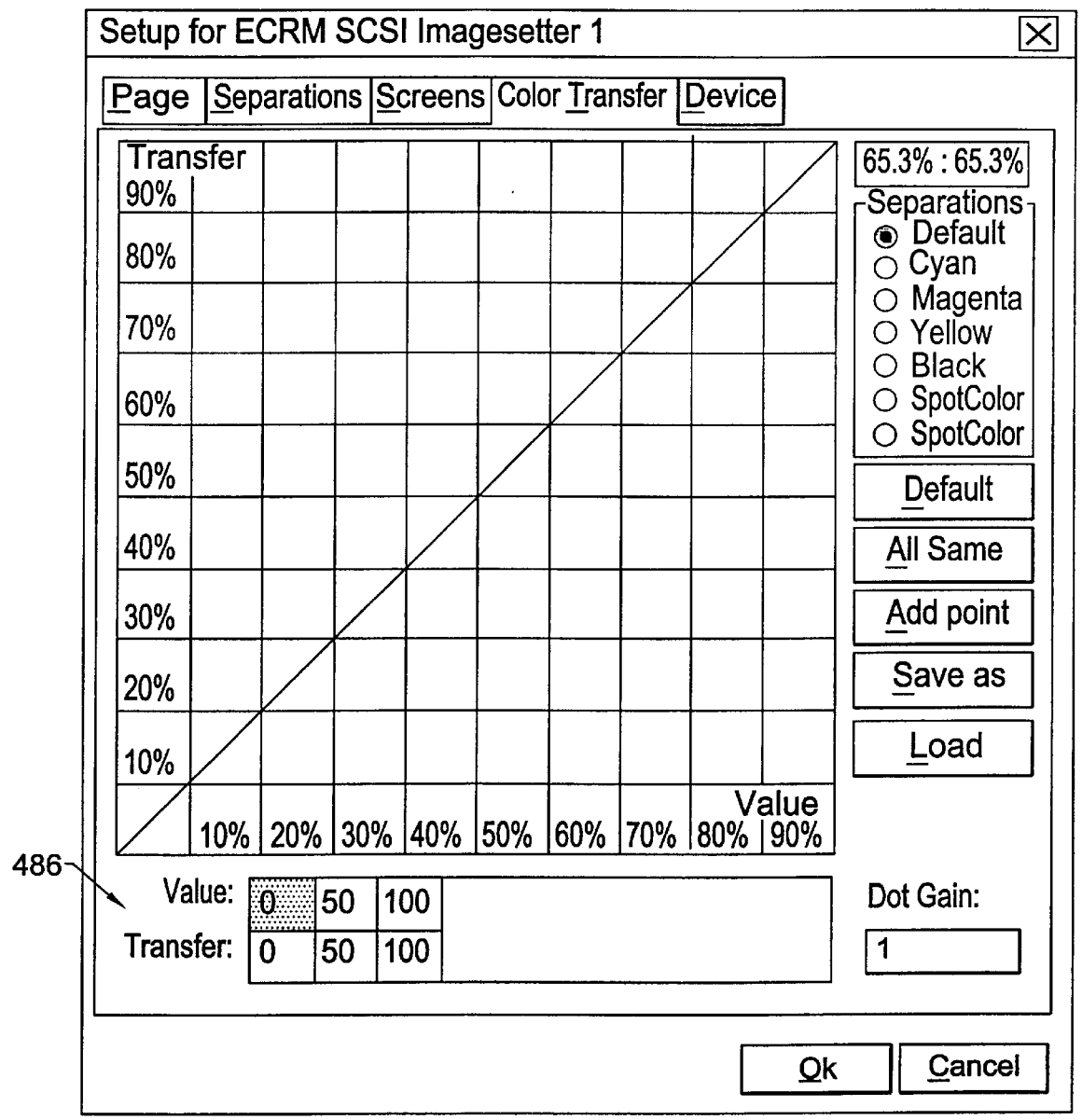

The Color Transfer tab window 484 offered within the WinPrint Setup screen of FIG. 18 is illustrated in FIG. 19. Within this window, the operator has control of color or black and white output. When the operator clicks on a radio button next to any of the color separations named at the top right, the operator will see a line in the graph the same color as the separation the operator has highlighted. If the operator desires to make any changes, the operator clicks on the line and drags to the desired settings. For even greater accuracy, the operator can highlight the Value or Transfer settings 486 illustrated in the boxes at the lower left of this window. Once highlighted, the operator may key in desired specifications. In addition, the operator can enter information as to anticipated dot gain on the press.

Figure 20:
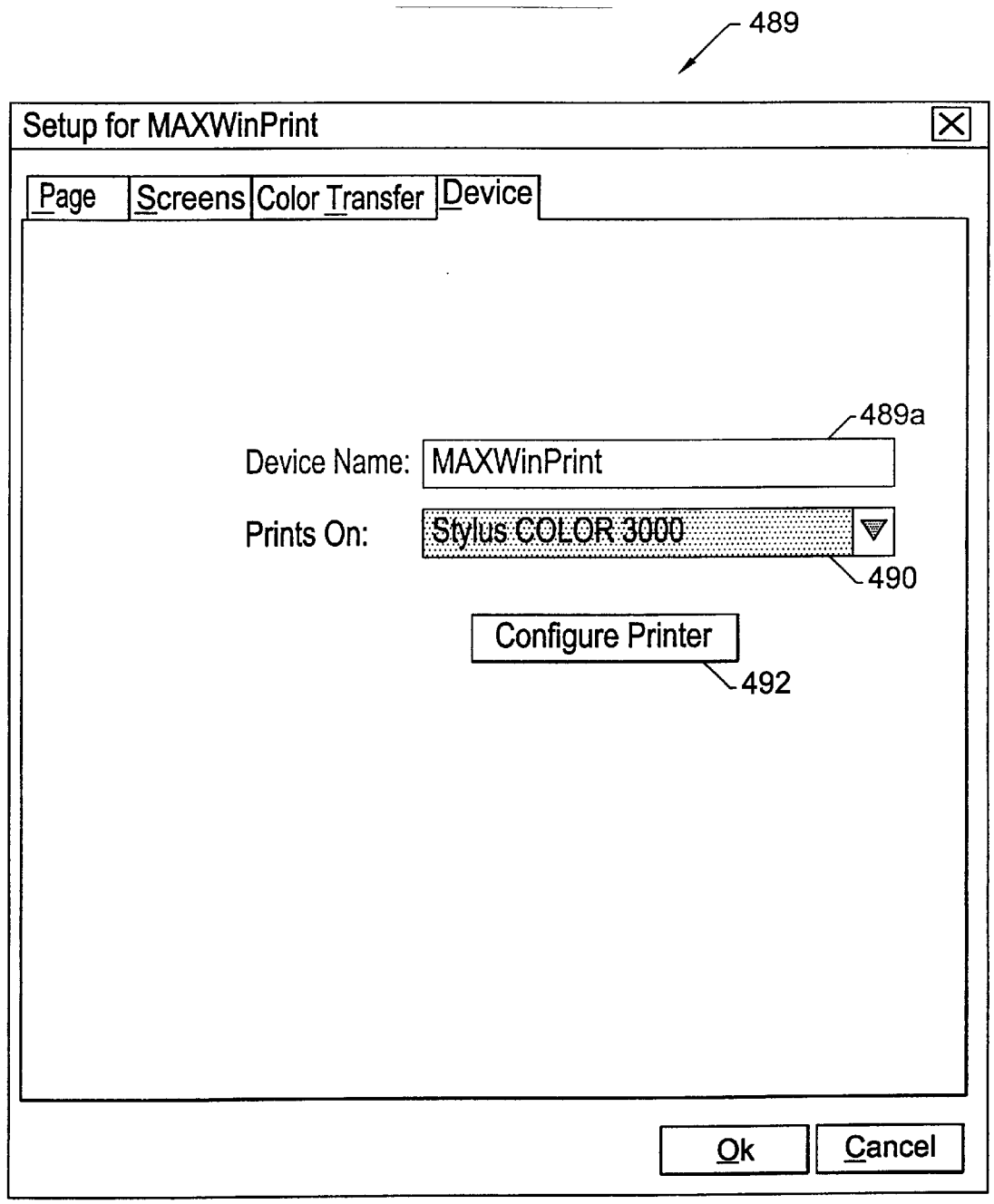

The last tab under the WinPrint Setup windows group is Device 488, which allows the module name to be changed (FIG. 20) via a setup window 489 in a device name box 489a. A pull-down menu in the Prints On 490 text window can be accessed by clicking on the down arrow at the right hand side of the text window. This provides a menu of Windows output devices the system or on the network.

Clicking on the Configure Printer button 492 will allow the operator to configure whatever output device the operator has selected in the Prints On window. In an example sample workflow, the operator could output to an Epson Stylus Color 3000 printer. The window, which appears after clicking on the Configure Printer, would be the Windows driver provided by the manufacturer, and would vary with different printers. As identified above, the scan, queue, RIP and WinPrint modules have been described. Other modules will now be described.

Figure 21:
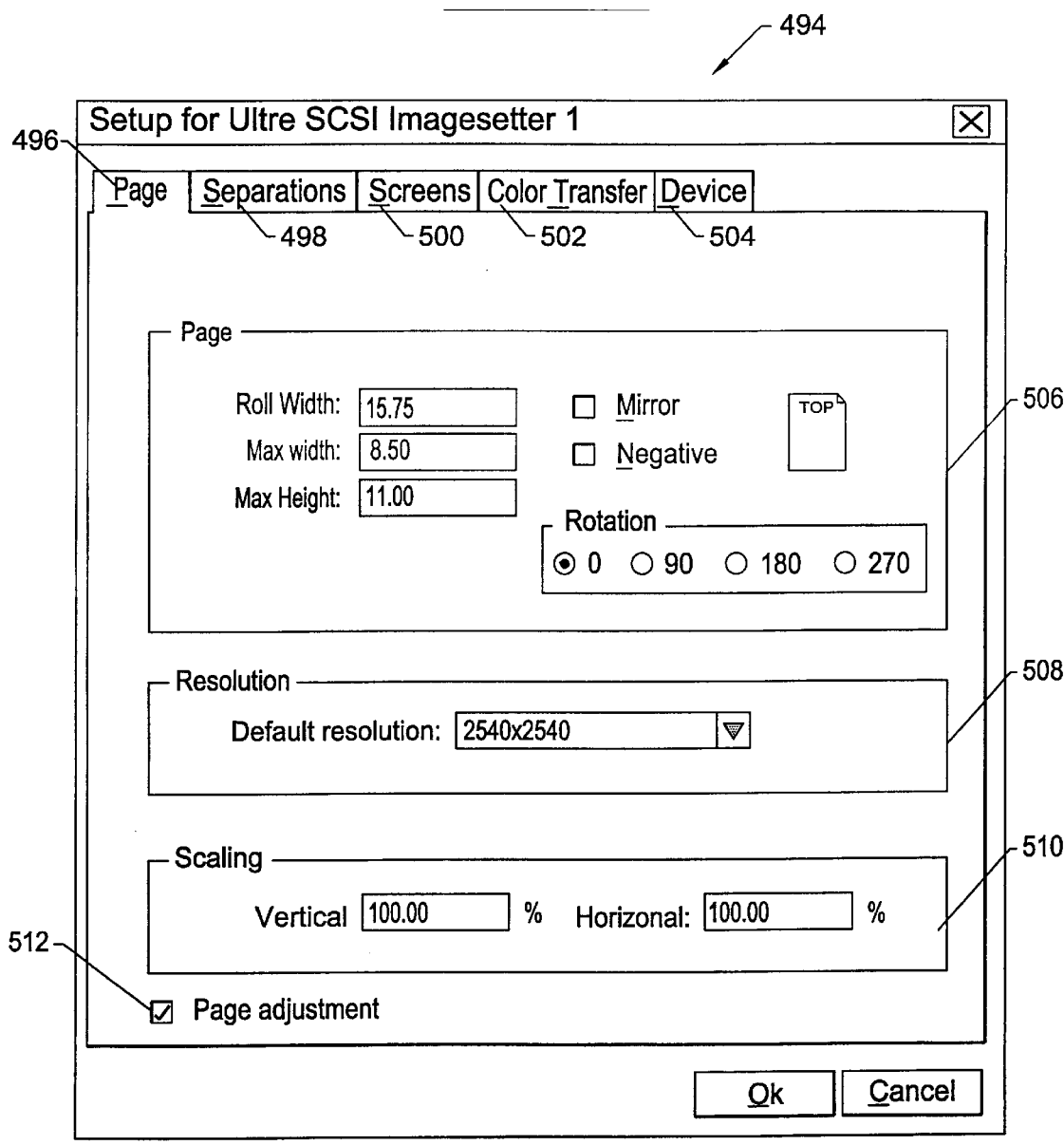
FIGS. 21–26 illustrate the setup windows for an imagesetter module.

A Ultre SCSI Imagesetter module 330 is shown in FIG. 1 as an output. This can be highlighted by left-clicking the mouse, then right-clicking the mouse to bring up a pop-up Setup menu. From this menu, the commands offered are, Setup (F5 keyboard shortcut), Media Feed, Media Cut, Feed and Cut, View (F4 keyboard shortcut), Clear Error, Launch Module, Change Computer (F6 keyboard shortcut), Delete (Delete keyboard shortcut) and About Module (Ctrl+F1 keyboard shortcut). Upon invoking the Setup command, the setup window 494 illustrated in FIG. 21 will appear.

All data shown in the window is default information the operator will see when bringing this window up. Based on individual system needs, changes can be made. The window defaults to the Page Tab 496 upon opening. Call up either Page 496, Separations 498, Screens 500, Color Transfer 502 or Device 504 by clicking your mouse on the appropriate tab folder.

Use keyboard shortcuts as opposed to a mouse, the following shortcuts will invoke the following commands: Page=Alt+P, Separations=Alt+E, Screens=Alt+S, Color Transfer=Alt+T and Device+Alt+D.

The Page area 506 provides for input of data regarding width of media roll, whether the operator wishes to mirror or have negative output and shows the top of the page being in a portrait setting. Also within the Page area shown in FIG. 21, the operator can input the maximum width and height of the pages that are being outputted and whether or not the operator wishes to rotate them. The rotation defaults to zero. To change this, simply click in one of the radio buttons next to the desired rotation angle.

Within the Resolution area 508, the operator is given a default dots per inch figure of 2540×2540. If the operator wishes to change to a different dpi setting, the operator clicks on the down arrow to the right of the text window. This will pull down a menu offering various dpi settings ranging from 1000×1000 all the way up to 3386×3386.

Scaling control in the scaling area 510 is also offered. Although the scaling defaults to 100% for both vertical and horizontal, the operator may enter whatever percentage the operator wishes to change final output to. For example, if the operator needs to reduce a file to fit certain dimensions on the final output, the operator determines the output size required and keys in the appropriate percentage of reduction, while checking page adjustments 512.

Figure 22:
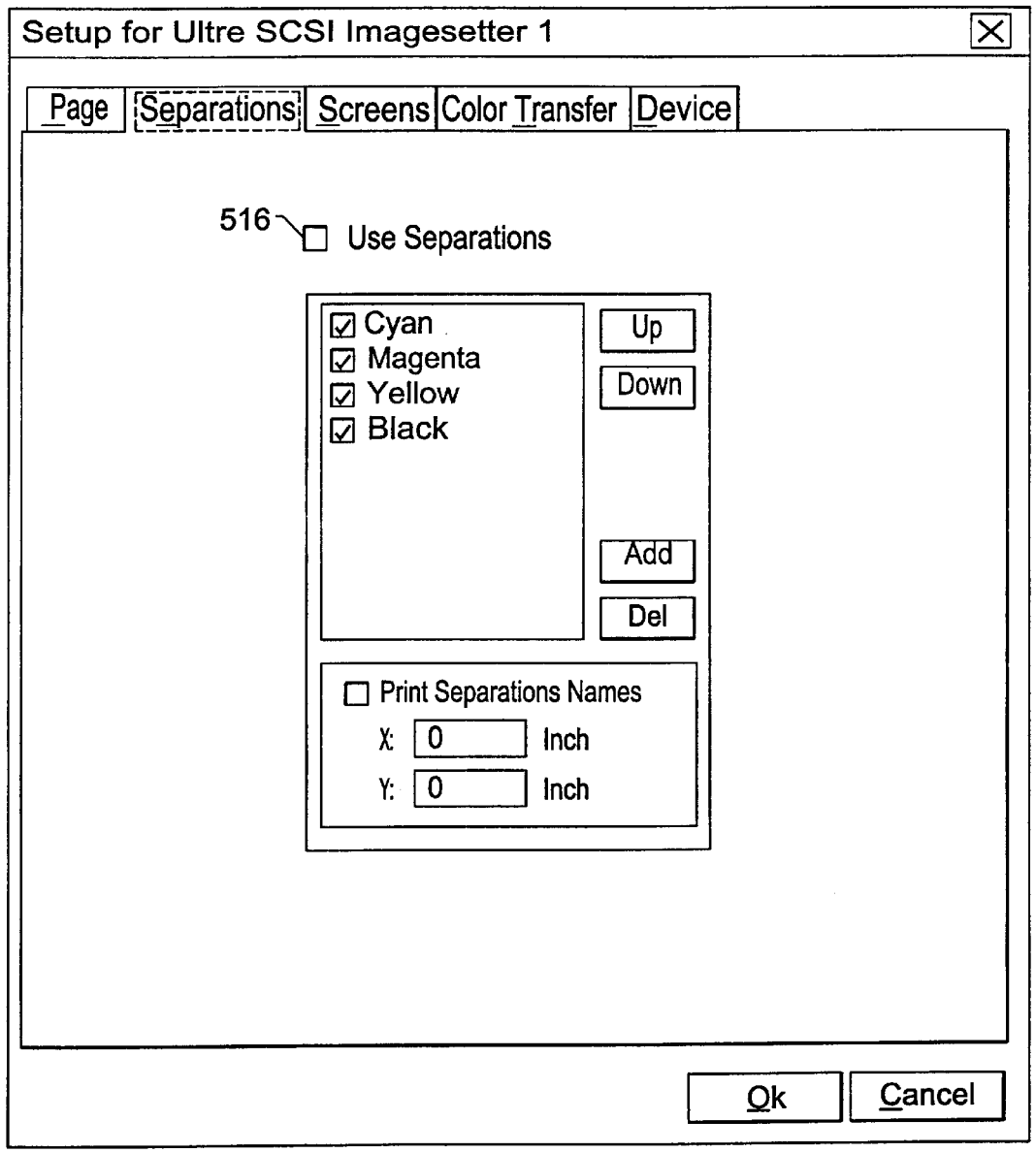

The next window of the Setup group is viewed by left clicking on the Separations tab 498. The window shown in FIG. 22 will appear. The use of separations is turned off in the default mode upon opening the window 514. Given that, the Up, Down, Add and Delete buttons are grayed out, as is the command for printing of separation names and coordinates. However, setting up for output of separations is simple, by clicking on the small box to the left of Use Separations 516 and a checkmark will appear. At that time, the Add and Delete buttons will be ready for use.

Figure 23:
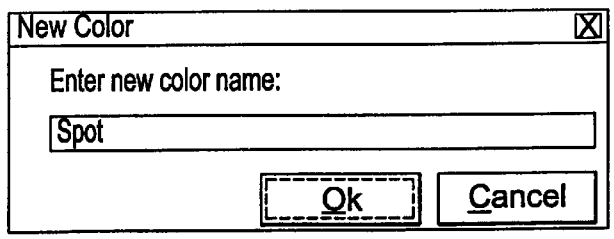

The name defaults to Spot (FIG. 23). However, as with other windows, the operator can change the name by highlighting the word Spot within the window and keying in the desired name. For example, if the operator is doing a 5/C job with regular 4/C process and an added spot color of Pantone 102, the operator could enter Pantone 102 Red within the text window. The spot color name will then appear within the list of separation names within the Separation window of the Setup command group of windows.

To delete a color, the operator highlights the name of that color on the separations list, then clicks on the Delete button or the Delete key keyboard shortcut. The operator cannot delete the primary separations of Cyan (C), Magenta (M), Yellow (Y) or Black (K). However, the operator can output one or more without the others. To output, for example, just the black plate, the operator clicks in the little box to the left of Cyan, Magenta and yellow. When the checkmark disappears, that particular separation will not be output.

The operator is also given control as to exactly where on the page the operator wishes to see these names within the X and Y coordinate boxes. Both default to zero, which would be the upper left-hand corner of the page. X is the amount in inches the operator wishes to come in from the left margin. If the operator wishes to print the separation names flush left, the operator leaves the X coordinate at zero. The Y coordinate is the amount in inches the operator wishes to come up from the bottom of the page. If the operator wishes to print separation names at the top left-hand corner of the page, the operator can use zero as the x coordinate. Y's exact location will be determined by how much of a margin is required at the top of the page.

Figure 24:
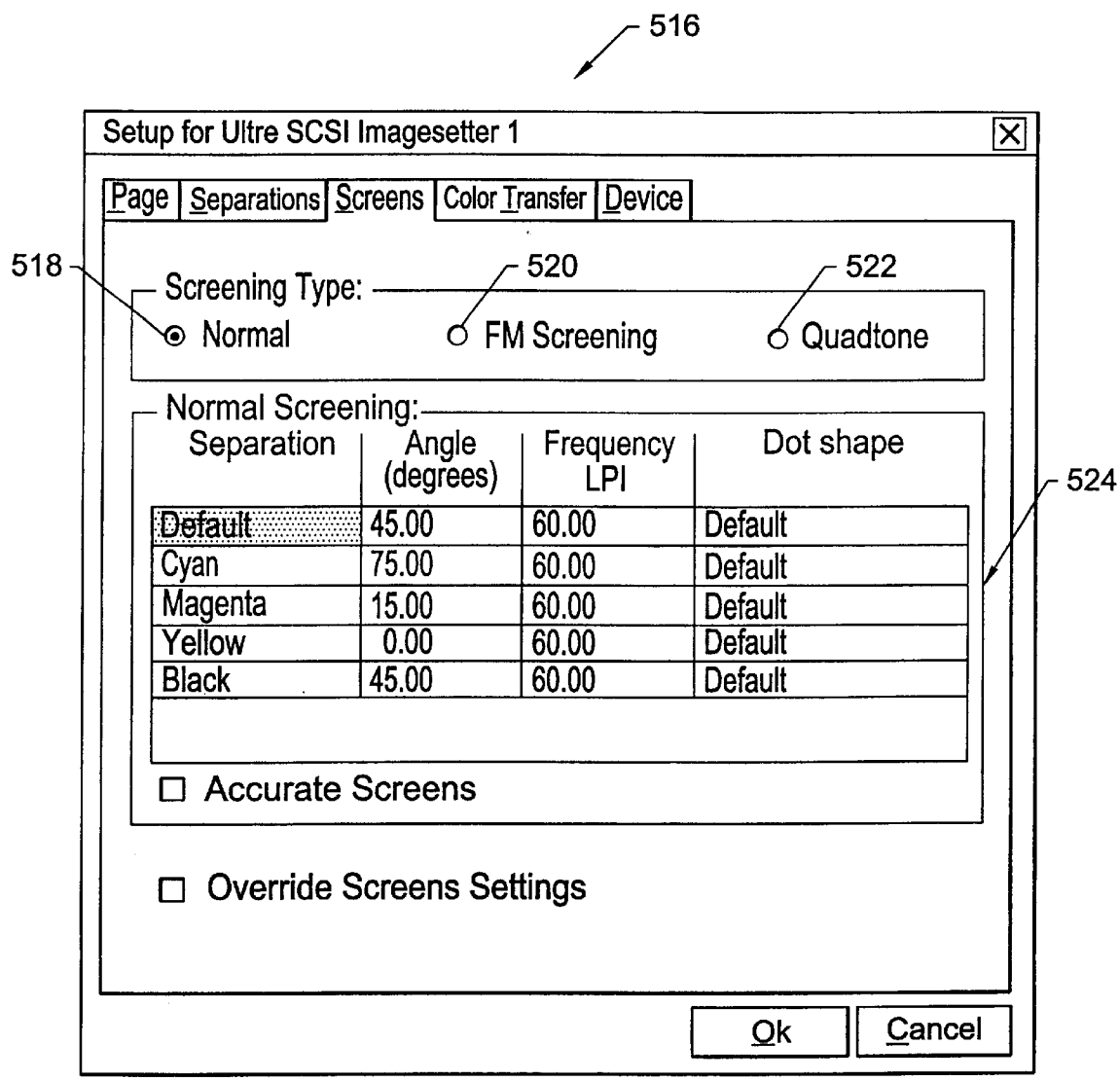

The next set of controls in the Ultre SCSI Imagesetter setup window is for Screens. When the operator clicks on the Screens tab, the window 516 in FIG. 24 will appear.

The operator has complete control of what type of screening the operator wishes to use and all aspects of the separation screen output within the window 516. When opened, the window defaults to Normal screening 518. If the operator wishes to use FM Screening 520 or Quadtone 522, the operator left-clicks the mouse in the radio button next to the desired screen type.

Within the Normal Screening section 524 of this window, the operator can either use the default settings for Angle (degrees) Frequency LPI (lines per inch) and Dot shape, or the operator can change any and all information. To change specifications, the operator left-clicks the mouse on the figure the operator wishes to change so that it is highlighted. New data is keyed in. The operator is also given the options of using Accurate Screens or to Override Screens Settings. A checkmark will appear indicating the command has been invoked. Once the operator has the desired information in place, click on the OK button to proceed.

Figure 25:
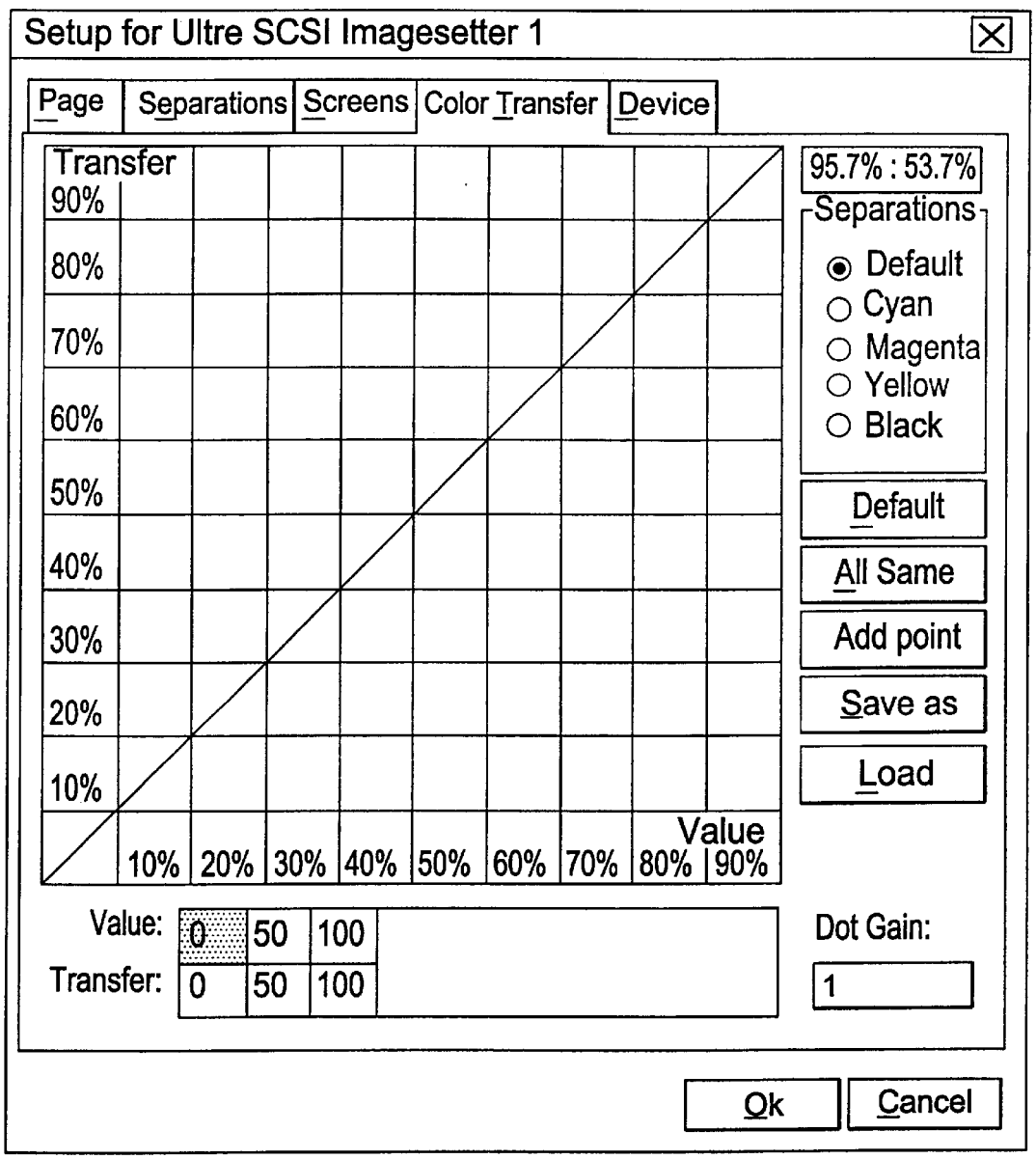

The next tab under the Setup group of windows for the Ultre SCSI imagesetter gives the operator exacting control over color transfer information. When the Color Transfer tab 502 is clicked, the window illustrated in FIG. 25 will pop up.

To change any of the transfer information, the operator clicks on the radio button next to the separation desired to change. Upon so doing, a line will appear in the graph the same color as the separation that has been highlighted. The operator can change value and transfer information by clicking on the line and dragging it to the desired location. For even more exacting Value and Transfer information, the operator can left-click the mouse in a box next to the command at the bottom left and key in the data.

To set all of the separations to the same color transfer, the operator clicks on the All Same button, or uses the Alt+A keyboard shortcut. If the operator wishes to insert a point on the graph line, the operator left clicks the mouse at the desired point, then clicks on the Add Point button.

Once the operator has entered the desired Color Transfer specifications, the Save As button is clicked on (Alt+S keyboard shortcut). This will save the particular configuration for future use. If one wishes to load the information into an overall system configuration and continue, one clicks on the Load button, or uses the Alt+L keyboard shortcut.

Upon completion of entering the data included in this window, click the OK button, or the keyboard shortcut of Alt+O. If one finds an error and desires to cancel the input of data, one clicks on the Cancel button, or uses the keyboard shortcut of Alt+C.

Figure 26:
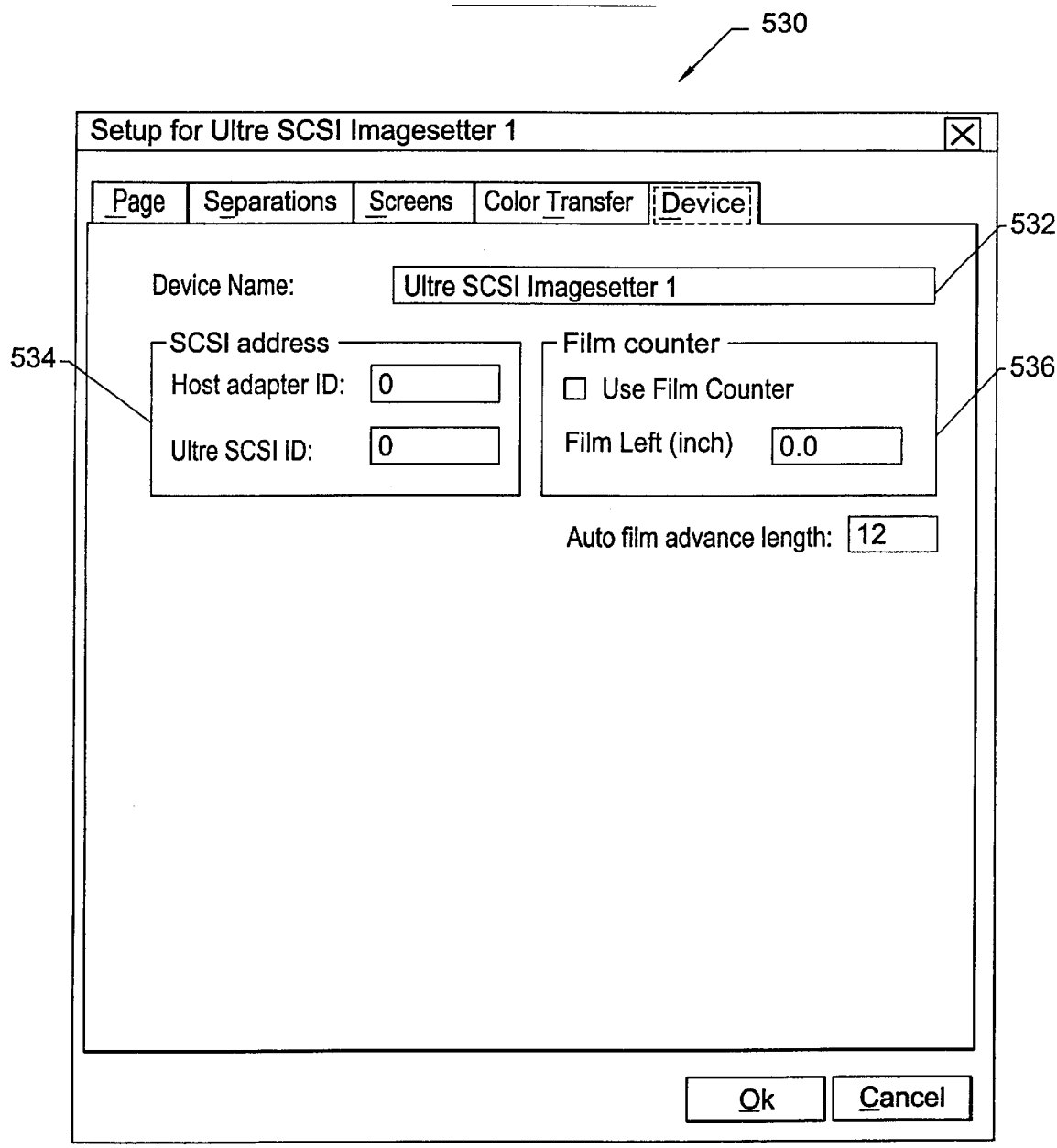

The Device window 530 (FIG. 26) enables one to input data in several areas. The Device Name text box 532 will show whatever name has been assigned to the device within the system workflow on the System Design Palette. If an operator wishes to rename the Ultre SCSI Imagesetter, the operator highlights the name and key in whatever name you wish to give it.

Two text windows in a SCSI address area 534 show the location of SCSI devices within the system. SCSI address and Ultre SCSI address will show by default the exact address of these devices. If the operator desires to change this information, the address shown is highlighted and key in a new one.

Upon opening this window, the Film Counter 536 will default to being turned off. To use it, the operator clicks in the small box next to Use Film Counter and a checkmark will appear. Upon invoking this command, the Film Left (inch) text box will automatically show exactly how much film is left on the roll in use. One can program how much film one wishes to have advanced between jobs by keying in this information in inches in the text box next to Auto film advance length.

Once all information is keyed in, Setup of the Ultre SCSI imagesetter is completed. At this point, if one desires to go back and change any information in any of the other windows within this group, one can click on the appropriate tab folder or use the appropriate keyboard shortcut. When everything is input as one wishes, one clicks on the OK button.

Other modules that can be configured include a proof module 338, which allows configuration of page dimensions, including media Roll Width, Maximum width of page and Maximum height of page as an output device. Mirroring capability is also possible, and options for rotation. One can also program in specifications for screens, such as Normal, FM Screen or Quadtone, based upon operator needs. Different dot sizes can be selected.

Figure 27:
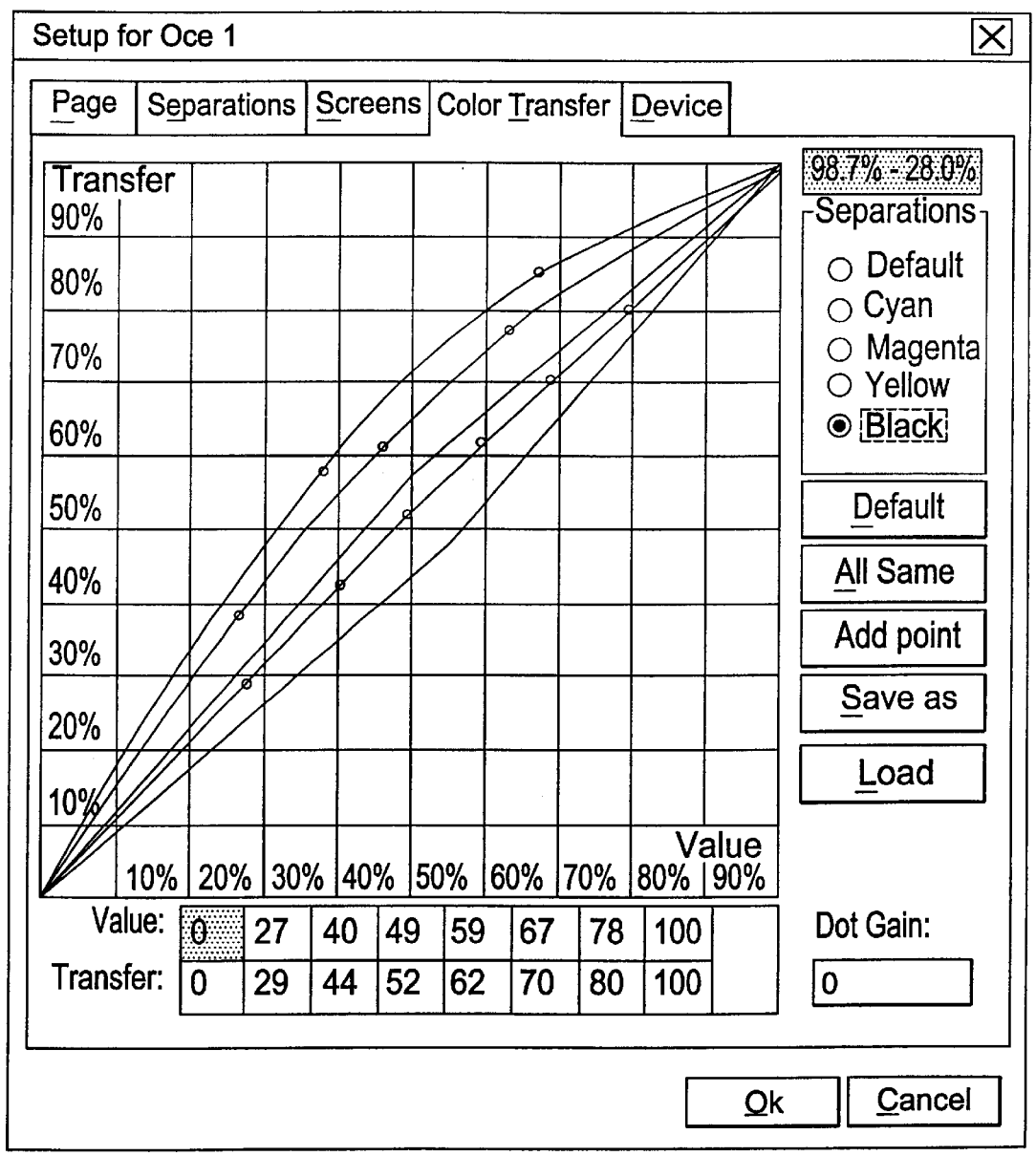
FIG. 27 illustrates a setup window for an OCE setup module.
Figure 29:
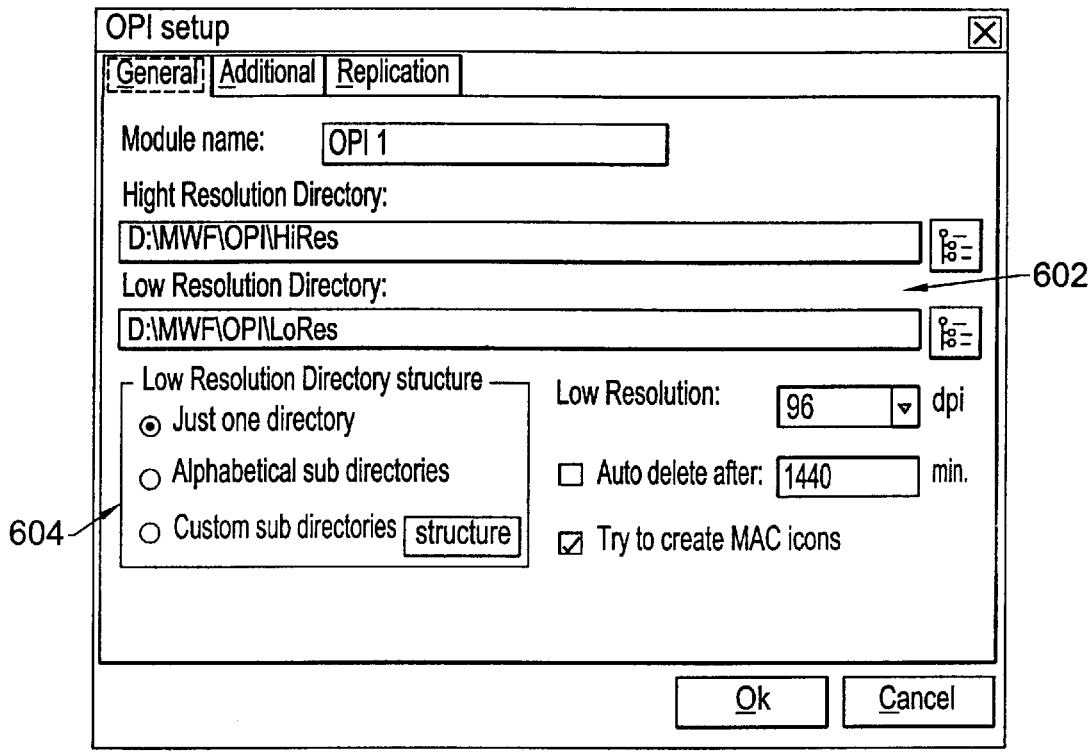
FIGS. 29–32 illustrate an OPI module setup windows.

An operator can set specific color transfer information on each separation by using a histogram chart as shown in FIG. 27. An operator clicks on the color one wishes to program transfer information for, then inputs the appropriate data. One is also given the option of making each separation identical by clicking on the All Same button at the right of the window, or using the keyboard shortcut of Ctrl+A. If one wishes wish to add a point to the histogram, one clicks on the Add point button. One may input Value and Transfer specifications in the text boxes at the bottom of the window. In addition, one can program in Dot Gain to accommodate a different press.

In a Device Name text box as in a separate window (not shown), one can rename the output device module within the workflow system and highlight the default information in the text box and key in the name desired. The proper port information shown in a menu can be changed as required.

A file output setup window (FIG. 28) directs PostScript®, Encapsulated PostScript® and Portable Document Format (PDF®) files to Raster Image Processes (RIPs). The module can be programmed to either Load Balance or Poll the RIPs on the network. Up to 20 characters with spaces can be used for the Module name. The Move type can be changed from Load Balance to Polling. Load Balance looks at the input (Spool) directory of the RIP(s) if any file(s) are in the directory and their size(s) are bigger then the programmed Max Sizes of Files in Directory, then the file is sent to the next available folder and checked again until a suitable directory is find.

Polling takes files in and sends them in rotation to each listed RIP(s) one after another, until finished and then starts over, all data is distributed equally. Data could be sent to RIP #1, RIP #2, RIP #3, RIP #1, RIP #2, RIP #3, etc. The Que Central module can receive data and send it to all NT capable RIPs. Multiple setup files can be loaded or saved, with multiple Que Central modules running in the workflow system setup.

An Open Prepress Interface (OPI) module 336 can be configured (OPI module), which allows open PrePress Interface (OPI) Built-in functionality within the RIP, as opposed running files through a separate OPI server. With this module, an operator can control all aspects of OPI, including directories for high and low resolution files. An operator can send high-resolution files, Tif, Tiff, or EPS to the \†OPI\HiRes folder and the OPI module does the rest.

The Module name located in the general setup window 600 is programmable up to 20 characters with spaces. High Resolution Directory/Low Resolution Directory 602 makes the directory for incoming HiRes/LoRes files. Actual Smart Scan Hot Folders are used to spool files into OPI HiRes folders. Incoming HiRes files are automatically copied to the correct LoRes folder using the Low Resolution dpi according to the Low Resolution Directory structure (LRDS) 604 and published as shared folders to Macintoshes and/or PC networks. Auto delete files from OPI folders or delete them by Time Stamp method. LRDS structure contains three methods for accepting and storing files. Just one Directory only works with one Hi/LoRes directory, Alphabetical sub directories automatically creates a directory every time a file comes into the OPI with the first letter different than the directories already created.

Figure 30:
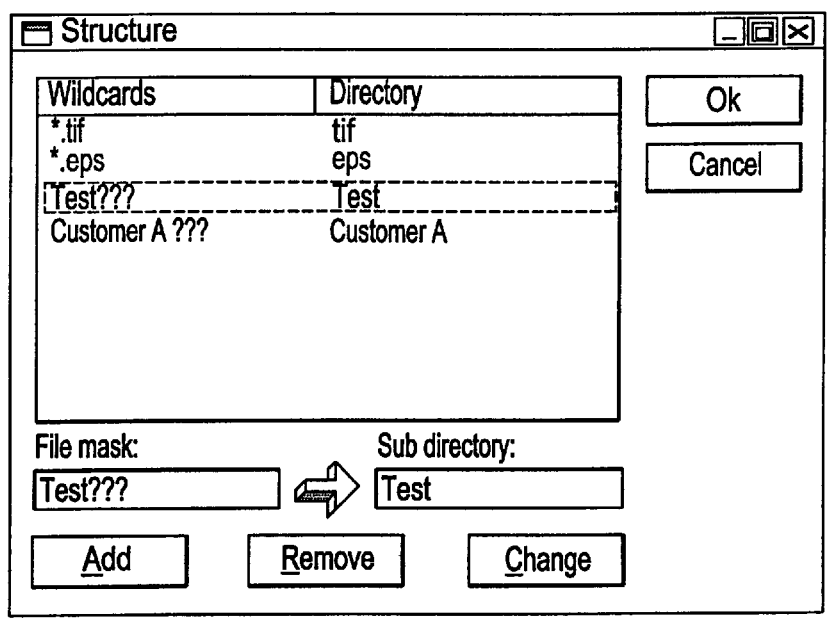
Figure 31:
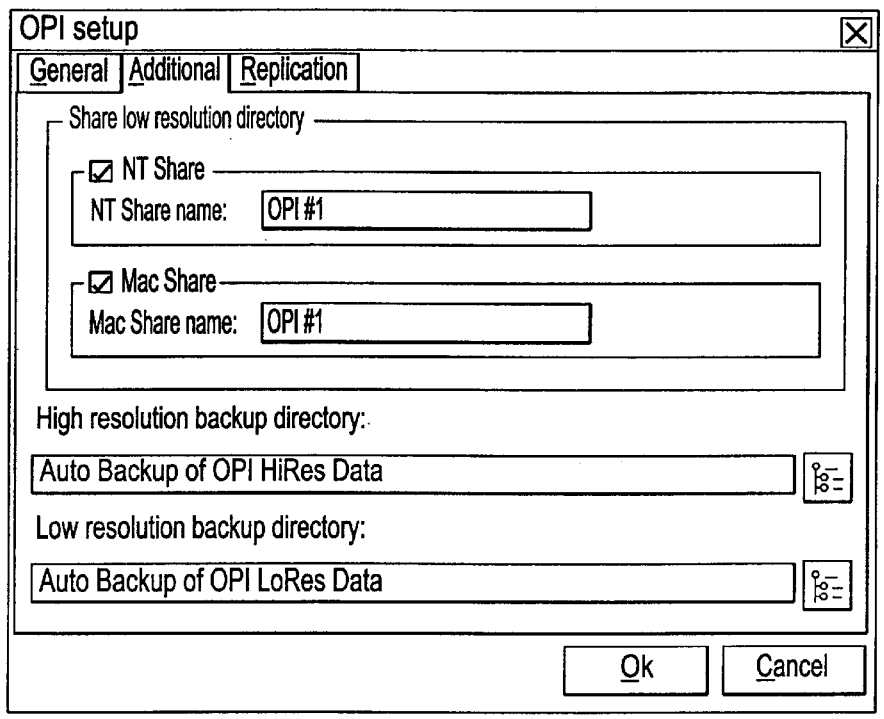
Figure 32:
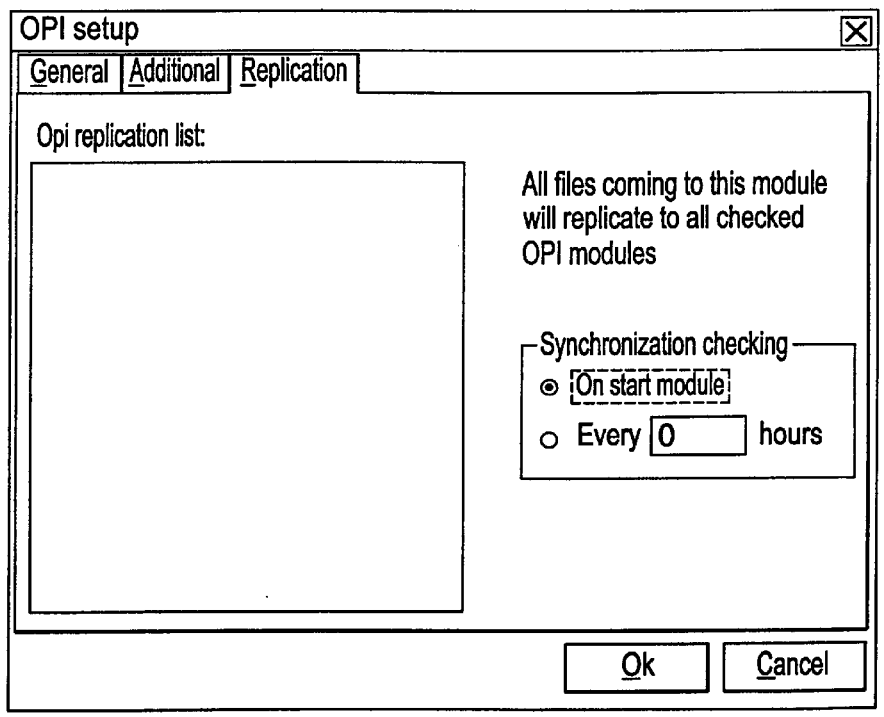
Figure 33:
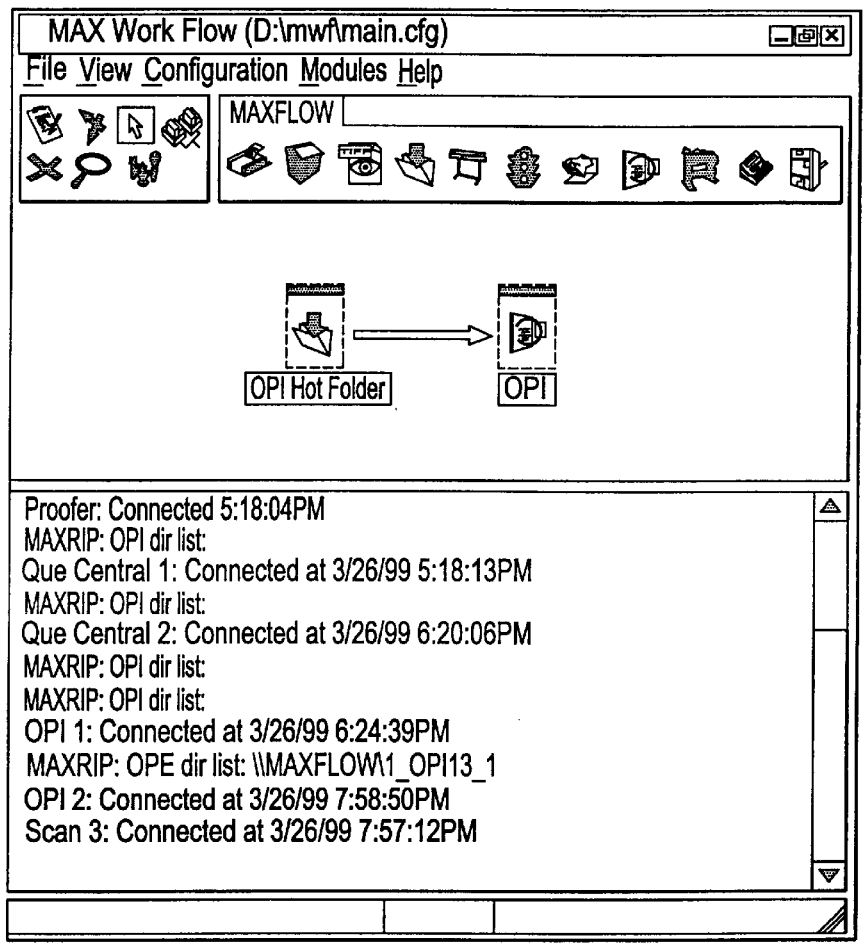
FIG. 33 illustrates an OPI setup in the system design palette.

Custom sub directories shown in FIG. 30 allows the user to create files mask directories with incoming files, example would be using the *,? to designate a wild card character in the file format. FIG. 31 shows OPI directories being published as shared folders to Macintoshes and PC networks. FIG. 32 shows a Replication screen for OPI directories that are used. If client software exists on remote machine(s) running OPI, a replication link can be established between OPI machines. There are two methods to synchronize the OPI folders. First is On Startup of the module and the second looks at the folder in a predetermined amount of time, for example, one hour. Thus, OPI will scan every hour. FIG. 33 shows the setup for an OPI directory.

Figure 34:
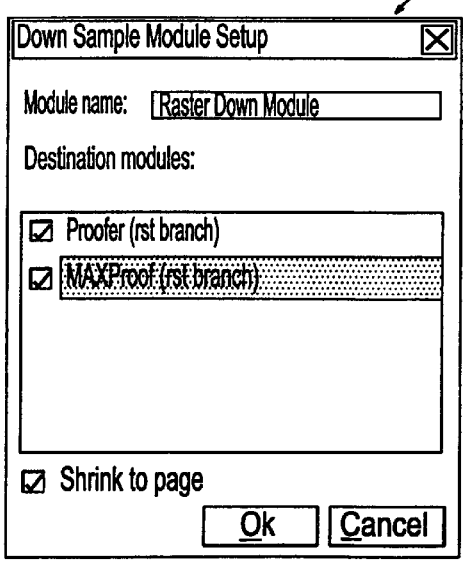
FIG. 34 illustrates a down sample module setup window.

A Raster Down Server takes in HiRes raster files and down samples (dpi) the file for proofing on slower resolutions machines. This module automatically down samples the files according to what device(s) are checked in the destination module. In a setup window 650 (FIG. 34), Module name is programmable up to 20 characters with spaces. Destination modules automatically appear if attached to the RDS module, check Shrink to page if page(s) are bigger then actual printer size. An example page would be pages ripped for broadsheet output and needing to be proofed on and 11×17 printer, check shrink to page.

A Film Saver Module can take in raster jobs and gang them together for outputting in the most efficient manner. Again Module names can be programmable. The jobs will be sent into a print pool until the size(s) of the job(s) are bigger then the programmed Film width size.

An Imposition Module Imposes PostScript®, Encapsulated PostScript® and Portable Document Format (PDF®) files into a Signature ready plate flats for outputting. New signature files can be created. A Signature Edit Button within a separate imposition modules window (not shown) can layout the plate and pages to the desired output specification of the device. Multiple pages can be output in imposed form, adding multiple pages to the configuration. These pages can be rotated or moved anywhere on the plate, crop marks, printer marks, and bleed and trim lines can be added to the plates, layout can be completed in Saddle Stitched or Perfect Bound format.

Figure 35:
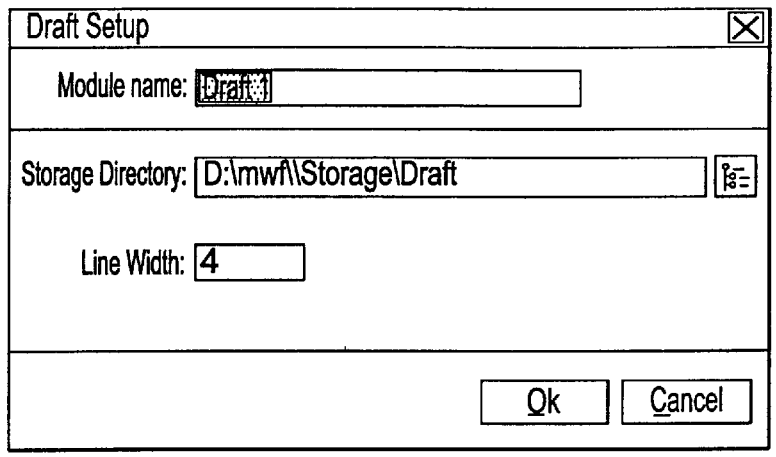
Figure 36:
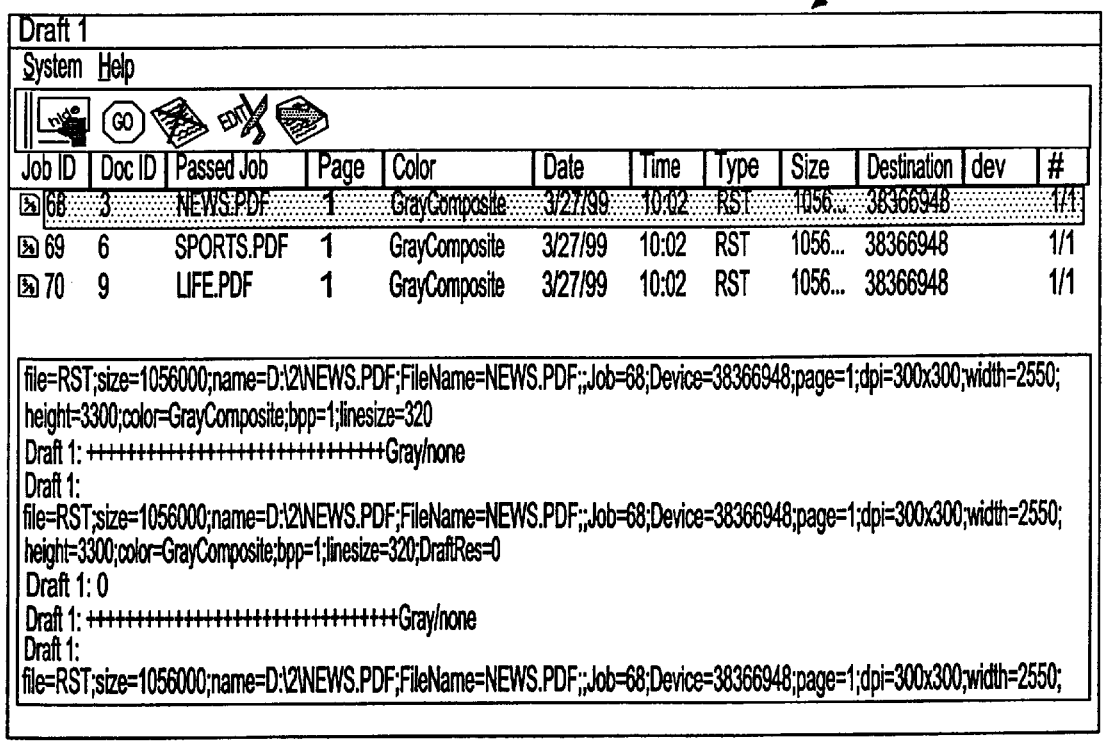

A Remote Proof Module requires only a name and a storage directory on the hard drive. A Storage Directory allows raster file(s) to be held for proofing by the client (FIGS. 35 and 36). Set the work area space inside the view area. FIG. 36 shows the view screen 660.

The View Screen 660 with five options is where the raster file(s) are held for proofing by the client.

The first three options are the same in all modules Hide module, GO/STOP, and Delete Job. The next two allow the user to Edit the Jobs or Send the Job into the next module.

Using tools under various icons to markup page either with text or boxes will display the area that needs changed. It is possible to zoom in or out on the page, and proof the page at the customer's site. Once page markup is done, a user simply hits two send buttons either with or without corrections back to the main site that originated the file.

FIG. 37 displays Edit Screen 670 with markups of the jobs coming back from customer site(s). The icons to the left of the job show if the job needs to be redone or if the file can be output. The Page with the blue arrow pointing right allows the user to send the job to the printer or the next module in workflow.

Figure 38:
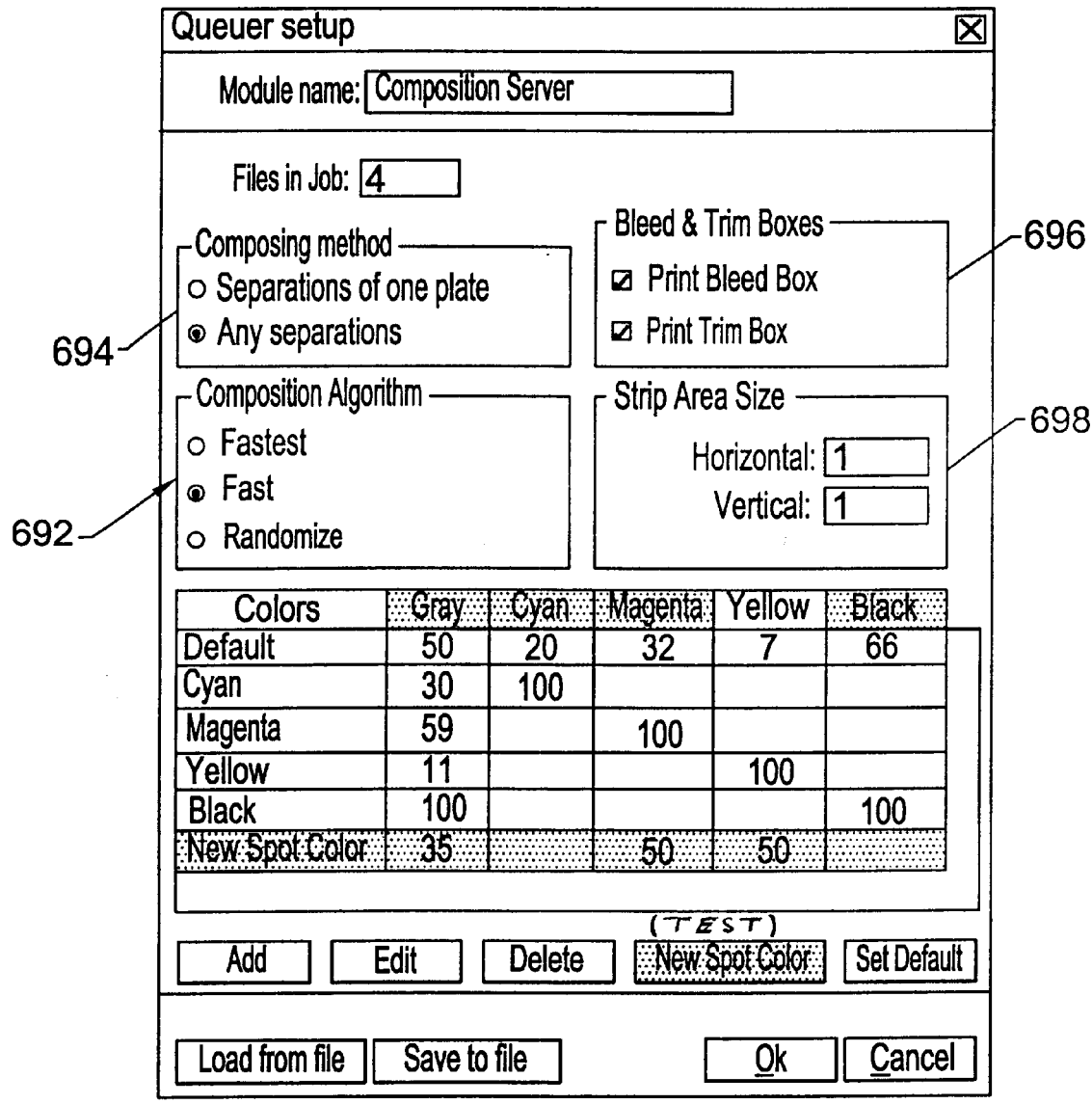
FIG. 38 illustrates a queuer setup window.

A Composite Server Module 356 (FIG. 38) accepts pre-separated files either PostScript®, or Raster files coming from the system RIP, Harlequin or Adobe RIPs. The module combines them back together for proofing, allowing for Bleed and Trim boxes to be applied to the pages. To check the overall position of the pages within the plate flat, while using the dots generated from the high resolution RIPs. This allows to proof the high resolution plate that are going to press for 100% accuracy. This module can also cut apart pages in 4,8,16 up flats from single page proofing either singled or duplexes sided.

The Composite Server module has a setup window 690 (FIG. 38) features three types of Composition Algorithms 692 for combining files back together. Fastest, Fast, Randomize the Fastest being the quickest way to combine files and the Randomize being the slowest but does the best quality output. Composing method 694 allows two types, Separations of one plate, and Any separation, Separations of one plate reads the plate names and puts the plates with same name back together for proofing. Any separation reads the Files in job box and waits for the appropriate number of jobs, before combining them back together.

This method allows the user to check multiple Black plates, etc. The Bleed and Trim Boxes 696 when checked, applies hairline rules around the page boarders showing bleed and cut areas. Strip Area Size 698 allows the user to remove gripper space that is on plate flats. The ability to control the ink colors and supported spot color is shown at the bottom with the Add, Edit Delete, New Spot Color, and Set Default buttons. To load saved configuration files, one uses the Load from file or Save to file buttons. Cut out Pages, Exclude pages with same numbers, Duplex plate pages (A&B, C&D) all these options deal with cut multiple page flats into single pages for proofing either single or double sided proofs. Cut out pages breaks down multiple page documents into single pages. Exclude pages with same number does just that will not print same number pages. Duplex plate pages backs up plate pages in order example 1,2,3,4 etc for book proofing.

A PS,EPS Optimizer Server takes in Postscript or EPS file and optimizes them for faster processing. This module can do compressions of images to optimization of postscript operators that are used over and over. Add thumbnail to EPS, slit composite EPS files into the single color EPS pages, check files for errors encode ASCII or Binary into images. Crop out unused areas of images automatically. Embed fonts into job for processing at another RIP or site. Remove or change images convert them on the fly or change from RGB to color on the fly.

This application is related to copending patent applications entitled, "METHOD OF ARRANGING A PREPRESS WORKFLOW," "METHOD AND SYSTEM FOR ARRANGING A WORKFLOW USING GRAPHICAL USER INTERFACE" and "PREPRESS WORKFLOW METHOD AND PROGRAM," which are filed on the same date and by the same assignee, the disclosures which are hereby incorporated by reference.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that the modifications and embodiments are intended to be included within the scope of the dependent claims.

That which is claimed is:

1. A method of configuring a prepress workflow that includes a raster image processor (RIP) comprising the steps of:
    loading a prepress memory manager on a local computer as a result of a user input such that a graphical user interface is displayed and includes a prepress system design palette and a raster image processor (RIP) icon that represents a raster image processor distributed object module used in a prepress workflow operation; and
    configuring the RIP distributed object module by user interfacing with the graphical user interface.

2. A method according to claim 1, and further comprising the step of dragging the RIP module icon from a modules toolbar into the system design palette.

3. A method according to claim 1, and further comprising the step of configuring the RIP distributed object module by opening a RIP setup window.

4. A method according to claim 3, wherein the RIP setup window is opened by clicking a mouse button when a pointer is entered on the RIP module icon.

5. A method according to claim 3, and further comprising the step of enabling an open prepress interface by clicking a box window contained within the RIP setup window.

6. A method according to claim 1, and further comprising the step of enabling an open prepress interface to store files to disk and allow the RIP distributed object module to process postscript file references to enhance speed of operation.

7. A method according to claim 3, and further comprising the step of invoking trapping within the RIP distributed object module by clicking a box window contained within the RIP setup window.

8. A method according to claim 1, and further comprising the step of dragging module icons representing desired prepress hardware and/or software distributed object modules to be used in a prepress workflow and operative with the RIP distributed object module from a modules toolbar into the prepress system design palette.

9. A method according to claim 8, and further comprising the step of linking the module icons based on user input in the order which represents how the prepress workflow proceeds along the selected hardware and/or software distributed object modules represented by the module icons.

10. A method of configuring a prepress workflow that includes a raster image processor (RIP) comprising the steps of:

loading a prepress memory manager on a local computer as a result of a user input such that a graphical user interface is displayed and includes a prepress system design palette and a raster image processor (RIP) icon that represents a raster image processor distributed object module used in a prepress workflow operation;

configuring the RIP distributed object module by user interfacing with the graphical user interface and by opening a RIP setup window; and entering within an entry line within the RIP setup window the amount of RAM designated to the RIP distributed object module at startup.

11. A method of configuring a prepress workflow that includes a Raster Image Processor (RIP) comprising the steps of:

loading a prepress memory manager on a local computer as a result of a user input such that a graphical user interface is displayed and includes a prepress system design palette;

selecting module icons representing desired prepress hardware and/or software distributed object modules to be used in a prepress workflow into the prepress system design palette, said module icons including a RIP module icon representative of a raster image processor distributed object module;

linking the module icons based on user input in the order which represents how the prepress workflow proceeds along the RIP distributed object module and other selected hardware and/or software distributed object modules represented by the module icons; and configuring the RIP distributed object module by user interfacing with the graphical user interface.

12. A method according to claim 11, and further comprising the step of configuring the RIP module by opening a RIP setup window.

13. A method according to claim 11, wherein the RIP setup window is opened by clicking a mouse button when a pointer is entered on the RIP module icon.

14. A method according to claim 12, and further comprising the step of enabling an open prepress interface by clicking a box window contained within the RIP setup window.

15. A method according to claim 11, and further comprising the step of enabling an open prepress interface to store files to disk and allow the RIP distributed object module to process postscript file references to enhance speed of operation.

16. A method according to claim 12, and further comprising the step of invoking trapping within the RIP distributed object module by clicking a box window contained within the RIP setup window.

17. A method according to claim 11, and further comprising the step of dragging module icons representing desired prepress hardware and/or software distributed object modules to be used in a prepress workflow and operative with the RIP distributed object module from a modules toolbar into the prepress system design palette.

18. A method according to claim 17, and further comprising the step of dragging a module icon representing the RIP distributed object module from the modules toolbar into the prepress system design palette.

19. A method according to claim 11, wherein the step of selecting module icons further comprises the step of user enabling a pull down menu and selecting appropriate prepress hardware and/or software distributed object modules corresponding to a desired hardware component and/or software function.

20. A method according to claim 11, and further comprising the step of launching a prepress memory manager at a remote computer based on user input at the local computer, and outputting the prepress workflow to an output device located at the remote computer.

21. A method according to claim 11, and further comprising the step of configuring a desired hardware and/or software distributed object module based on user input by selecting a module icon representing the desired prepress hardware and/or software distributed object module to be configured by user selecting a dialog box corresponding to the desired hardware and/or software distributed object module and inputting information within the dialog box.

22. A method according to claim 11, and further comprising the step of dragging the module icons into the system design palette with a user selected pointer tool and linking the module icons once positioned within the system design palette with a user selected linking tool.

23. A method of configuring a prepress workflow that includes a Raster Image Processor (RIP) comprising the steps of:

loading a prepress memory manager on a local computer as a result of a user input such that a graphical user interface is displayed and includes a prepress system design palette;

selecting module icons representing desired prepress hardware and/or software distributed object modules to be used in a prepress workflow into the prepress system design palette, said module icons including a RIP module icon representative of a raster image processor distributed object module;

linking the module icons based on user input in the order which represents how the prepress workflow proceeds along the RIP distributed object module and other selected hardware and/or software distributed object modules represented by the module icons; and configuring the RIP distributed object module by user interfacing with the graphical user interface including opening a RIP setup window; and entering within an entry line within the RIP setup window the amount of RAM designated to the RIP distributed object module at startup.

24. A graphical user interface contained on a computer screen of a computer and used for establishing a prepress workflow comprising:

a prepress system design palette;

a modules toolbar operative with the system design palette, said modules toolbar containing module icons representing different prepress hardware and/or software distributed object modules that can potentially be used in a prepress workflow operation, such that the module icons can be dragged from the modules toolbar to the system design palette and linked together based on user input in the order which represents a desired prepress workflow; and a RIP module icon contained within the system design palette and representative of a raster image processor (RIP) distributed object module that can be user selected for configuring the raster image processor distributed object module.

25. A graphical user interface according to claim 24, and further comprising a systems toolbar having an icon representative of a linking tool.

* * * * *

UNITED STATES PATENT AND TRADEMARK OFFICE
CERTIFICATE OF CORRECTION

PATENT NO.    : 6,483,524 B1
DATED         : November 19, 2002
INVENTOR(S)   : Eugene A. Liamkin et al.

It is certified that error appears in the above-identified patent and that said Letters Patent is hereby corrected as shown below:

<u>Title page,</u>
Item [75], Inventors, "Andri P. Petchenkine" should be
-- Andrei A.P. Petchenkine --

Signed and Sealed this

Twenty-second Day of July, 2003

JAMES E. ROGAN
*Director of the United States Patent and Trademark Office*